(12) United States Patent
Wu

(10) Patent No.: US 11,216,746 B2
(45) Date of Patent: Jan. 4, 2022

(54) UTILIZING MACHINE LEARNING AND COMPOSITE UTILITY SCORES FROM MULTIPLE EVENT CATEGORIES TO IMPROVE DIGITAL CONTENT DISTRIBUTION

(71) Applicant: Facebook, Inc., Menlo Park, CA (US)

(72) Inventor: Jingxian Wu, Redwood City, CA (US)

(73) Assignee: FACEBOOK, INC., Menlo Park, CA (US)

(*) Notice: Subject to any disclaimer, the term of this patent is extended or adjusted under 35 U.S.C. 154(b) by 1058 days.

(21) Appl. No.: 15/824,380

(22) Filed: Nov. 28, 2017

(65) Prior Publication Data

US 2019/0164082 A1 May 30, 2019

(51) Int. Cl.
*G06N 20/00* (2019.01)
*G06Q 50/00* (2012.01)
*G06Q 30/02* (2012.01)

(52) U.S. Cl.
CPC ......... *G06N 20/00* (2019.01); *G06Q 30/0277* (2013.01); *G06Q 50/01* (2013.01)

(58) Field of Classification Search
CPC ..... G06N 20/00; G06Q 30/0277; G06Q 50/01
See application file for complete search history.

(56) References Cited

U.S. PATENT DOCUMENTS

| | | | | |
|---|---|---|---|---|
| 8,135,718 B1 * | 3/2012 | Das | ............... | G06F 16/90335 |
| | | | | 707/748 |
| 8,332,512 B1 * | 12/2012 | Wu | ............... | G06Q 50/01 |
| | | | | 709/224 |
| 9,542,649 B2 * | 1/2017 | Su | ............... | G06N 5/04 |
| 9,589,262 B2 * | 3/2017 | Graylin | ............... | G06Q 20/385 |
| 10,387,514 B1 * | 8/2019 | Yang | ............... | G06K 9/00718 |
| 2013/0124298 A1 * | 5/2013 | Li | ............... | G06Q 30/0241 |
| | | | | 705/14.42 |
| 2014/0337436 A1 * | 11/2014 | Hoagland | ............... | G06F 16/9535 |
| | | | | 709/204 |
| 2015/0310344 A1 * | 10/2015 | Gunjan | ............... | G06N 5/04 |
| | | | | 706/52 |
| 2017/0076345 A1 * | 3/2017 | Pan | ............... | H04L 67/22 |
| 2017/0083522 A1 * | 3/2017 | Somekh | ............... | G06N 20/00 |

(Continued)

FOREIGN PATENT DOCUMENTS

AU       2008288885 B2 * 12/2012    ............. G06Q 30/02

*Primary Examiner* — Eric Nilsson
(74) *Attorney, Agent, or Firm* — Keller Jolley Preece

(57) ABSTRACT

The present disclosure is directed toward systems, methods, and non-transitory computer readable media for providing digital content to users by applying a machine learning model based on composite utility scores reflecting multiple events categories. For example, the systems described herein can identify, from a digital content publisher, significance ratings of various event categories that a user can perform. The systems can analyze user activities to determine a composite utility score for user based on events that the users have performed. Furthermore, in one or more embodiments, the systems train a machine learning model based on training composite utility scores to identify additional users likely to have elevated composite utility scores. Moreover, the disclosed systems can utilize the trained machine learning model to provide targeted digital content to computing devices of these additional users.

20 Claims, 15 Drawing Sheets

(56) References Cited

U.S. PATENT DOCUMENTS

2017/0185601 A1* 6/2017 Qin .................. G06F 16/24578
2017/0199930 A1* 7/2017 Trabelsi ............. G06F 16/3344
2018/0260715 A1* 9/2018 Yan ......................... G06N 5/02

* cited by examiner

UTILIZING MACHINE LEARNING AND COMPOSITE UTILITY SCORES FROM MULTIPLE EVENT CATEGORIES TO IMPROVE DIGITAL CONTENT DISTRIBUTION

BACKGROUND

Advancements in computing devices and networking technology have led to a variety of innovations in providing targeted digital content across computer networks. For example, online digital content systems are now able to serve targeted digital content to users spanning the globe almost instantaneously. Indeed, whether in entertainment, employment, or advertising, modern online digital content systems are able to provide instantaneous targeted digital content to thousands of users via various types of client devices.

Despite these advances however, conventional digital content distribution systems continue to suffer from a number of disadvantages. For instance, while conventional digital content distribution systems can execute digital content campaigns and provide targeted content to selected users (e.g., a targeted audience), these systems are often rigid and narrowly focused. To illustrate, some conventional digital content distribution systems optimize digital content campaigns to a target audience in an effort to maximize a particular event, such as conversions. However, by focusing narrowly on a particular event, these conventional digital content distribution systems often fail to capture value for publishers in other areas.

Such rigidity further results in systems built on relatively small data sets that provide decreased accuracy. To illustrate, while conventional digital content distribution systems can optimize a digital content campaign to target audiences based on a single event (e.g., conversions), this optimization approach often yields a relatively small data set for optimizing digital content campaigns (e.g., only those users that have resulted in conversions). This lack of data often leads to inaccurate and inefficient digital content campaigns.

Thus, there are several disadvantages with regard to conventional digital content distribution systems.

SUMMARY

One or more embodiments described herein provide benefits and solve one or more of the foregoing or other problems in the art by providing systems, methods, and non-transitory computer readable media that utilize a machine learning model and composite utility scores from multiple event categories to improve digital content distribution. In particular, the disclosed systems can flexibly consider multiple different event categories (and thus approximate a more accurate representation of true value to a publisher) in selecting targeted digital content to provide to client devices in executing digital content campaigns. For example, in one or more embodiments, the disclosed systems generate composite utility scores for individual users by applying a significance (e.g., a weighting value) to a variety of different event categories and corresponding events performed by the individual users. The disclosed systems can further train a machine learning model based on the composite utility values and provide targeted digital content to computing devices of new users utilizing the trained machine learning model.

To elaborate, the systems disclosed herein can identify a number of different event categories (e.g., purchases, clicks, etc.) that a user can perform together with a corresponding significance of each event category. The disclosed systems can further analyze a repository of user activity to determine training users (with corresponding user characteristics) that have performed one or more events from the identified event categories. Based on the one or more events performed by the training users and the significance of each event, the disclosed systems can generate a training composite utility score for each training user (e.g., by applying a weight to each event based on the identified significance of that category). In addition, the disclosed systems can train a machine learning model based on the training composite utility scores. Moreover, the disclosed systems can utilize the trained machine learning model to provide targeted digital content to computing devices of new users (e.g., new users with user characteristics predicted to yield a high composite utility score). In particular, the disclosed system can utilize composite utility scores either in real-time delivery optimization or targeting optimization (e.g., for value-based look-a-likes).

By utilizing a plurality of different event categories to generate composite utility values and train a machine learning model, the disclosed systems can provide increased flexibility and accuracy over conventional systems. Indeed, the disclosed systems can consider a plurality of different event categories in providing targeted digital content and thus increase overall value to a publisher in executing a digital content campaign. Furthermore, by considering multiple different event categories via composite utility values, the disclosed systems and methods can increase the data available for providing targeted digital content and, thus, increase the accuracy of resulting digital content campaigns.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
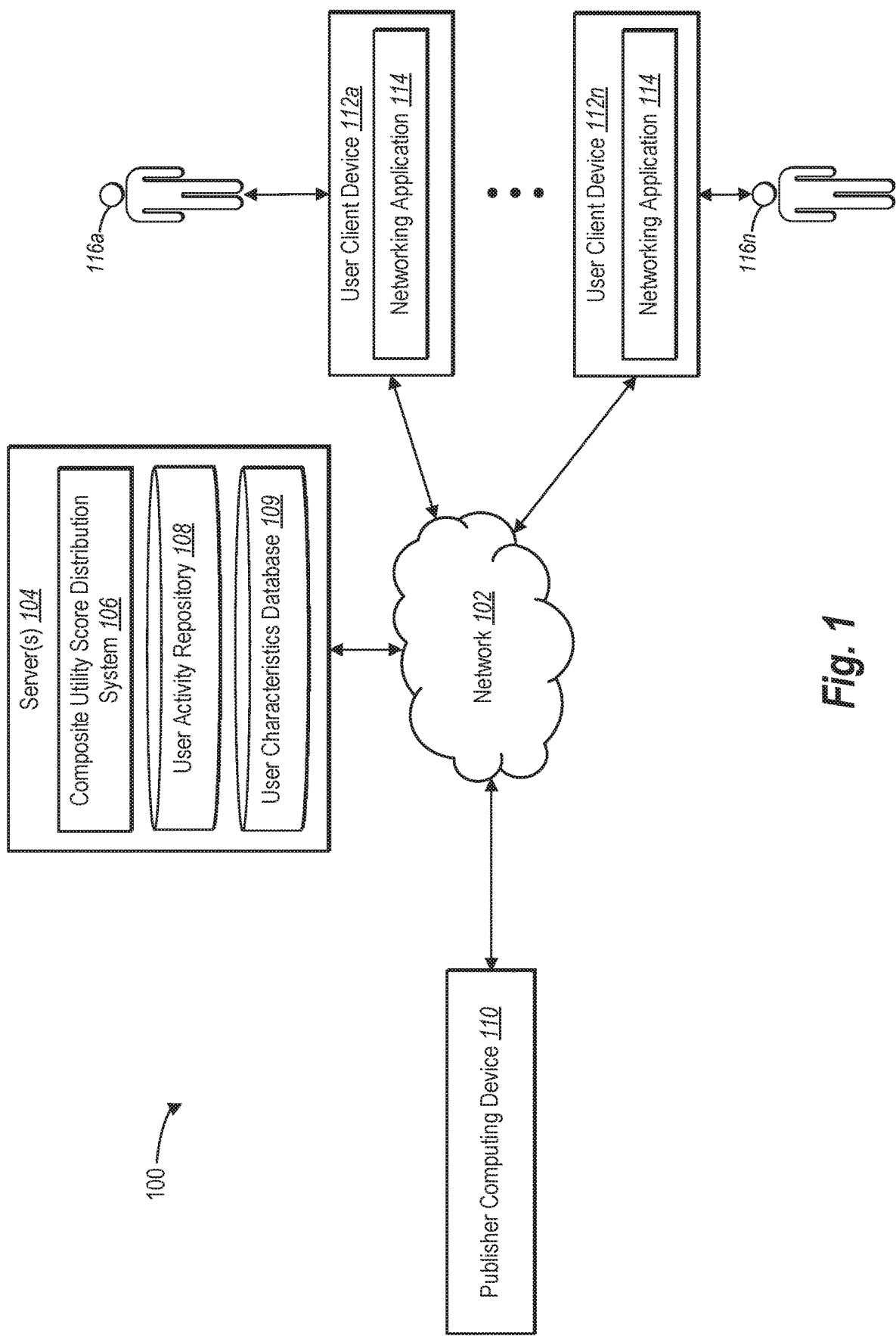
FIG. 1 illustrates a schematic diagram of an example environment of a composite utility score distribution system in accordance with one or more embodiments.

One or more embodiments described herein provide benefits and solve one or more of the foregoing or other problems in the art with a composite utility score distribution system that utilizes a machine learning model and composite utility scores reflecting a significance of multiple event categories to improve digital content distribution. In particular, in one or more embodiments, the composite utility score distribution system considers multiple different event categories in selecting targeted digital content for client computing devices, thus improving total value to a given publisher for any given digital content campaign. In particular, the composite utility score distribution system can determine the relative significance of multiple different event categories for a given publisher and then generate composite utility scores for a plurality of training users. The composite utility score distribution system can then train a machine learning model based on the composite utility scores to identify a target audience of users who are also likely to have high composite utility scores.

To illustrate, the composite utility score distribution system can identify a first significance of a first event category and a second significance of a second event category by, for example, receiving an indication from a publisher of the first significance and the second significance. In addition, the composite utility score distribution system can analyze a digital repository of user activity to determine a training user that has performed one or more events from the first event category and/or one or more events from the second event category. The composite utility score distribution system can also identify user characteristics of the training user (e.g., by accessing profile information). Based on the significance of the first event category and the significance of the second event category, the composite utility score distribution system can generate a training composite utility score for the training user by applying the first significance to the events from the first event category performed by the training user and applying the second significance to the events from the second event category performed by the training user. Utilizing the training composite utility score, the composite utility score distribution system can train a machine learning model to identify users to whom to provide digital content.

As just mentioned, in one or more embodiments, the composite utility score distribution system identifies a significance of each of a number of event categories (e.g., purchases, clicks, etc.) that a user can perform. For example, the composite utility score distribution system can receive an indication from a publisher computing device of one or more event categories and the significance of the one or more event categories to a particular digital content campaign. To illustrate, the composite utility score distribution system can provide a user interface to a publisher computing device whereby a publisher can select significance of different event categories.

As mentioned above, the composite utility score distribution system can further analyze a repository of user activity to determine training users that have performed events corresponding to different event categories. For example, the composite utility score distribution system can analyze user activity for training users (e.g., members or subscribers) to determine which of the training users have performed an event from one of the event categories.

Utilizing user characteristics of each training user as well as the significance of each event, the composite utility score distribution system can generate a training composite utility score for each training user. In particular, the composite utility score distribution system can determine an event category score for each event performed by the training user, and apply a weight to each event category score based on the identified significance of that category. Thus, in one or more embodiments, the composite utility score distribution system generates a composite utility score that represents a total value for a training user for a particular advertising campaign.

In addition, as mentioned above, the composite utility score distribution system can utilize training composite utility scores together with a machine learning model to provide digital content to additional users. More specifically, the composite utility score distribution system can train a machine learning model, using the training composite utility scores for each training user, to identify additional users that are likely to have high composite utility scores (i.e., utility scores above a particular threshold). For example, in one or more embodiments, the composite utility score distribution system trains a machine learning model to predict target user characteristics that correlate with particular composite utility scores (e.g., composite utility scores above a threshold).

After training, the composite utility score distribution system can utilize the trained machine learning model. In particular, the composite utility score distribution system can utilize the trained machine learning model to identify a target audience of users who fit the predictions of the machine learning model—i.e., users that are predicted to yield a high composite utility score. Moreover, the composite utility score distribution system can provide targeted digital content to the identified target audience by way of corresponding client devices of the users.

To illustrate, the composite utility score distribution system can utilize the trained machine learning model as part of real-time delivery optimization or as part of targeting optimization (e.g., using value-based look-a-likes). To elaborate, the composite utility score distribution system can implement a real-time delivery machine learning model to determine, in a real-time bidding scenario, which users to deliver digital content. Additionally or alternatively, the composite utility score distribution system can implement a targeting machine learning model to determine characteristics of users to target within a digital content campaign (e.g., providing digital content to users who share common attributes).

In addition to using a machine learning model to provide digital content to client devices, the composite utility score distribution system may further implement a machine learning model to suggest event categories and corresponding significance ratings (e.g., scores) to publisher client devices. In particular, the composite utility score distribution system may train a machine learning model to predict event categories and significance ratings for those event categories that would be the most effective for a digital content campaign. For example, the composite utility score distribution system may analyze event categories and corresponding significance ratings of a plurality of digital content campaigns, and, by way of a trained machine learning model, predict, for a new digital content campaign, those event categories and corresponding significance ratings that would be most effective.

The composite utility score distribution system provides several advantages over conventional digital content distribution systems. For example, the composite utility score distribution system can optimize a digital content campaign by determining the combined value of multiple event categories. Indeed, digital content campaigns can be considered an ecosystem where users influence each other and where some events may cause other events to occur. Thus, where many conventional advertising systems focus narrowly on a particular feature (e.g., clicks) the composite utility score distribution system can provide a more holistic approach to providing digital content to client devices by determining the relative value of various event categories and approximating the total value of providing digital content to any particular user.

Furthermore, as described in greater detail below, the composite utility score distribution system can enable publishers to customize a digital content campaign across various event categories to more specifically tailor the digital content campaign to the publisher's broader objectives. To illustrate, in one or more embodiments, the composite utility score distribution system provides a graphical user interface ("GUI") whereby a publisher can provide input to indicate the significance of various event categories. Based on the selected significance of various event categories, the composite utility score distribution system can tailor a target audience of users specifically to the unique objectives of a given advertising campaign. Therefore, the composite utility score distribution system provides more effective advertising campaigns than conventional advertising systems because the composite utility score distribution system more accurately identifies those users that a publisher values in relation to a variety of different metrics.

As another advantage over conventional advertising systems, the composite utility score distribution system can increase the size of available training data sets and, therefore, improve the accuracy and efficiency of resulting models. In particular, because the composite utility score distribution system can consider multiple event categories in generating composite utility scores, the composite utility score distribution system can pool a greater number of training users to utilize in training a machine learning model. Indeed, the composite utility score distribution system can consider training users that have performed any events from of a variety of different event categories. Because the composite utility score distribution system can pool a larger training data set, the composite utility score distribution system can generate more accurate predictions and provide targeted digital content to user client devices most likely to maximize overall value.

Additionally, as briefly mentioned above, because the composite utility score distribution system generates composite utility scores based on multiple factors, including event categories, a significance of each event category, and user activity, the composite utility score distribution system increases flexibility for generating and executing digital content campaigns. Indeed, the composite utility score distribution system can employ a flexible model that considers multiple different events based on the preferences of a particular publisher for a particular campaign. Furthermore, the composite utility score distribution system can adjust parameters to determine users that correspond to the publisher's input while automatically providing digital content to those users that maximize overall value. Therefore, the composite utility score distribution system is more flexible and effective than conventional systems.

More detail regarding the composite utility score distribution system will now be provided with reference to the figures. For example, FIG. 1 illustrates a schematic diagram of an example environment 100 for implementing a composite utility score distribution system 106 in accordance with one or more embodiments. An overview of the composite utility score distribution system 106 is described in relation to FIG. 1. Thereafter, a more detailed description of the components and processes of the composite utility score distribution system 106 is provided in relation to the subsequent figures.

As shown in FIG. 1, the environment 100 includes (i.e., may be implemented by) server(s) 104, the publisher computing device 110, user client devices 112a-112n (referred to herein collectively as "user client devices 112") associated with users 116a-116n (referred to herein collectively as "users 116"), and a network 102. Each of the components of the environment 100 can communicate via the network 102, and network 102 may be any suitable network over which computing devices can communicate. Example networks are discussed in more detail below in relation to FIG. 14.

As illustrated in FIG. 1, the server(s) 104 include the composite utility score distribution system 106, a user activity repository 108, and a user characteristics database 109. For example, the composite utility score distribution system 106 may be implemented by (e.g., installed on) the server(s) 104 as hardware, software, or both. Additionally, the user activity repository 108 may be located on the server(s) 104 as one or more databases to store user activity logs. Likewise, the user characteristics database 109 may be located on the server(s) 104 as one or more storage locations that store sets of user characteristics and/or other information corresponding to individual users.

As used herein, a "user" refers to an individual, company, business, group, or other entity who interacts with the composite utility score distribution system 106 by way of a user client device (e.g., the user client device 112a). For example, a user can include a member or subscriber of a social networking system (e.g., a social networking system that includes or implements the composite utility score distribution system 106). In addition, the term "user client device" refers to a computing device operated by a user and may include a device such as a desktop computer or a mobile device (e.g., a smartphone).

Furthermore, as used herein, a "publisher computing device" refers to a computing device operated by a digital content publisher (e.g., an advertiser, marketer, author, streaming provider, studio, distributor or other publisher of digital content). For example, a publisher computing device can include one or more servers, computers, or mobile devices (e.g., smartphones) that communicate with the composite utility score distribution system 106 and/or the user client devices 112 via the network 102. A publisher computing device can generate digital content (e.g., advertisements) and provide the generated digital content to the composite utility score distribution system 106, whereupon the composite utility score distribution system 106 can distribute the digital content to the user client devices 112. A publisher computing device can further present, for display, a GUI by which an advertiser, representative, operator, or other entity associated with the publisher computing device can input preferences associated with a digital content campaign.

Although FIG. 1 depicts the composite utility score distribution system 106 located on the server(s) 104, in some embodiments, the composite utility score distribution system 106 may be implemented by (e.g., located entirely or in part) on one or more other components of the environment 100. For example, the composite utility score distribution system 106 may be implemented by the publisher computing device 110, the server(s) 104, the user client devices 112, and/or the network 102. Similarly, although FIG. 1 depicts the user activity repository 108 and the user characteristics database 109 located on the server(s) 104, in some embodiments the user activity repository 108 and the user characteristics database 109 are located externally from the server(s) 104 at, for example, one or more third-party servers.

As illustrated in FIG. 1, the composite utility score distribution system 106 may communicate with the user activity repository 108 and the user characteristics database 109 directly, bypassing the network 102, and using an appropriate communication protocol. To illustrate, the composite utility score distribution system 106 may communicate with the user activity repository 108 to access user activity logs for a particular user to determine whether the user has performed a particular event.

As used herein, the term "event" refers to an action performed by a user. In particular, the term event includes an event performed by a user within a particular event category. Thus, an event can refer to an instance or occurrence of a user performing an action of a given event category. Accordingly, as used herein the term "event category" refers to a class, set, classification, or type of user action. For example, an event category can include (but is not limited to) types of user actions such as purchases, installations, add-to-cart events, clicks, shares, downloads, or views. In addition, an event category can include types of user actions (e.g., events) performed over a certain period of time such as a frequency of purchases, a frequency of installations, a frequency of add-to-cart events, a frequency of clicks, a frequency of shares, a frequency of downloads, or a frequency of views. An event category can also include a recency of purchases, a recency of installations, a recency of add-to-cart events, a recency of clicks, a recency of shares, a recency of downloads, or a recency of views.

Furthermore, as used herein, the term "event category score" refers to a numerical representation of events within an event category. In particular, an event category score can include a numerical representation of a number of events that a user (e.g., user 116a) has performed within an event category (e.g., a number of purchases, a number of clicks, etc.). Similarly, the event category score can include a numerical representation of a monetary amount (e.g., a monetary amount of purchases, or a monetary value of clicks). As an illustration, of "events," "event categories," and "event category scores," consider a user that selects digital content provided via a website on ten different occasions. Each user selection of digital content comprises an event corresponding to a particular event category (e.g., a clicks event category). Moreover, the number of times that the user selects digital content can be represented as an event category score (e.g., 10 clicks).

As further illustrated in FIG. 1, the composite utility score distribution system 106 may further communicate with the user characteristics database 109 to access information pertaining to user characteristics. As used herein, the term "user characteristics" (or "set of user characteristics") refers to attributes associated with a given user (e.g., user 116a). For example, the term user characteristics includes profile information (e.g., information stored in a user profile), demographic information, or geographic information. To illustrate, user characteristics can include age, sex, gender, height, occupation, marital status, work history, education history, education level, income, religion, ethnicity, language, device type, applications installed on or utilized by a client device, current location (e.g., address, latitude and longitude coordinates, etc.), previous locations, frequently visited locations, home location, or work location.

As illustrated in FIG. 1, the composite utility score distribution system 106 may communicate with the publisher computing device 110 via network 102 to determine a significance of a number of event categories for one or more advertising campaigns. As used herein, the term "significance" refers to an importance of a given event category. A significance can include a score or rating of the importance of an event category. For example, a significance can include a score or rating such as a rating from 1-10 (e.g., integers and/or non-integers), a score out of 100, a score corresponding to a written expression of significance such as "not at all significant," "somewhat significant," "very significant," etc.

As outlined in greater detail below, the composite utility score distribution system 106 can compute significance scores (i.e., significance ratings) in a variety of ways. For example, in one or more embodiments, the composite utility score distribution system 106 utilizes true value of business (monetary long-term value, long-term return on ad spend (ROAS), or otherwise defined by publisher depending on business model and how it measures performance) as dependent variable (Y), and short-term events occurrences, counts, or values as independent variable (X's), and run prediction (regression, clustering, classification) models (i.e., a machine learning model) to find significant features and associated coefficients as significance scores. Similarly, in one or more embodiments, the composite utility score distribution system allows publishers to custom define events and corresponding significance scores.

As mentioned, the composite utility score distribution system 106 may provide a GUI to the publisher computing device 110, and the composite utility score distribution system 106 can further receive an indication from the publisher computing device 110 of a significance of each event category. Additional detail regarding a GUI for determining the significance of various event categories is provided below with reference to FIG. 2.

As mentioned above, in one or more embodiments, the composite utility score distribution system 106 also utilizes a significance of event categories together with events performed by individual users to generate a composite utility score for one or more users. As used herein, a "composite utility score" refers to a score that represents a measure of worth, value, or importance that a user has to a particular publisher (or digital content campaign) with regard to multiple different event categories. In particular, the composite utility score includes a score that measures value to a publisher based on a combination of multiple event categories. To illustrate, a composite utility score can include a measure of value that reflects a combination of monetary value (e.g., a dollar amount), social value (e.g., influence of a user on other users), an exposure value (e.g., an amount of exposure that a user can provide), a lead generation value, or a traffic value. As outlined in greater detail below, the composite utility score distribution system 106 can generate a composite utility score by applying weights to event category scores from a plurality of event categories, where the weights for each event category are based on the significance of the given event category. Additional detail regarding the composite utility scores is provided below with reference to FIG. 3.

The composite utility score distribution system 106 can distribute (e.g., via the network 102) digital content to users 116 based on the determined significance of each event category and also based on detected user activity. As used herein, the term "digital content" refers to content or data that is transmitted over a communication network (e.g., the Internet or an intranet). In particular, digital content includes text, images, audio, and audiovisual content. For instance, digital content can include content that promotes a product, service, or another offering by an entity (e.g., a publisher, such as an advertiser). In one example, a web page displays one or more content items (e.g., items of digital content) to a user viewing the web page. In another example, a user views digital content in connection with viewing other audiovisual content. For example, in one or more embodiments, digital content is offered as part of a social networking news feed or as a digital advertisement within a messaging application as part of a digital advertising campaign. Moreover, as used herein the term "targeted digital content" refers to digital content provided to a user based on user characteristics of the user.

Moreover, as used herein, the term "digital content campaign" refers to a series of actions, rules, and/or processes for disseminating digital content. In particular, a digital content campaign includes one or more content items (e.g., advertisements) and one or more campaign parameters for disseminating the digital content. To illustrate, a digital content campaign includes digital content together with campaign parameters for bidding on impression opportunities, sending content items to client devices, or targeting particular client devices and/or users.

As mentioned above, in one or more embodiments, the composite utility score distribution system 106 utilizes a machine learning model to provide digital content when implementing a digital content campaign. As used herein, a "machine learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to a neural network (e.g., a convolutional neural network or deep learning), decision tree, association rule learning, inductive logic programming, support vector learning, Bayesian network, regression-based model, principal component analysis, or a combination thereof.

In one or more embodiments, the composite utility score distribution system 106 trains a machine learning model with training data. As used herein, the term "training" refers to information utilized to train (e.g., tune or teach) a machine learning model. Thus, a training user with a training composite utility score refers to a user with a composite utility score utilized to train a machine learning model. Additional detail regarding training a machine learning model is provided below with reference to FIGS. 5-9.

As illustrated in FIG. 1, the user client devices 112 each include a networking application 114 (e.g., a social networking application and/or a messaging application). The networking application 114 can be implemented in whole or in part by software or hardware installed on a user client device. In addition, the networking application 114 can facilitate communications between users 116 via user client devices 112, and may further facilitate communications with the composite utility score distribution system 106. Indeed, the networking application 114 can receive data from the composite utility score distribution system 106 and present the data to a user via a GUI within a user client device. For instance, the networking application 114 can present, for display, digital content provided by a publisher by way of the publisher computing device 110. The networking application 114 can further enable a user to interact with digital content by selecting (e.g., clicking) digital content (e.g., an advertisement), purchasing a product or service, sharing a digital content item, liking a digital content item, etc.

As further illustrated in FIG. 1, the server(s) 104 may generate, store, receive, and transmit any type of data, such as digital content, user activity information, and/or user characteristics. For example, the server(s) 104 may transmit data to a user client device to provide digital content, as mentioned above. Furthermore, the server(s) 104 can communicate with a user client device via the network 102 to receive user activity information and/or user characteristics, and the server(s) 104 can further store the received information in the user activity repository 108 and the user characteristics database 109, respectively. The server(s) 104 can also transmit electronic messages between one or more of user client devices 112. In one example embodiment, the server(s) 104 comprise a content server. The server(s) 104 can also comprise a communication server or a web-hosting server.

In one or more embodiments, the server(s) 104 include a digital content server and/or an auction server. For example, the server(s) 104 can include a digital content server that identifies impression opportunities associated with a user client device (e.g., user client device 112a), analyzes user characteristics associated with the user 116a, and provides digital content to the user client device 112a in response to impression opportunities. The content distribution server can further generate and publish digital content (e.g., advertisements). In addition, the digital content server can set or identify campaign preferences for a digital content campaign such as bidding amounts (for an online auction), budgets, a target audience, preferred distribution avenues, or significance ratings for one or more event categories.

Moreover, in one or more embodiments, the serer(s) 104 can include an auction server that can perform an online auction. For example, in response to receiving an impression opportunity, the online auction can generate bids for a plurality of publishers based on digital content campaign parameters, including significance ratings of event categories. Moreover, the auction server can determine a winning bid and corresponding winning publisher. Based on the winning bid, the digital content server can provide digital content from the winning publisher to a client device of a user. Additional details regarding the server(s) 104 will be discussed below with respect to FIG. 14.

Although FIG. 1 illustrates the composite utility score distribution system 106 implemented by the server(s) 104, in other embodiments the composite utility score distribution system 106 may be implemented across the publisher computing device 110, the server(s) 104, and/or the user client devices 112. For example, the composite utility score distribution system 106 can be implemented in whole, or in part, by each of the publisher computing device 110, the server(s) 104, and/or the user client devices 112.

As mentioned, in one or more embodiments, the server(s) 104 can include all, or a portion of, the composite utility score distribution system 106. Specifically, the composite utility score distribution system 106 can comprise an application running on the server(s) 104 or a portion of a software application that can be downloaded from the server(s) 104. For example, the composite utility score distribution system 106 can include a web hosting application that allows the user client devices 112 and/or the publisher computing device 110 to interact with content hosted at the server(s) 104. To illustrate, in one or more embodiments, the user client devices 112 and/or the publisher computing device 110 can access a webpage supported by the server(s) 104. For instance, the user client devices 112 and/or the publisher computing device 110 can run an application to allow a user (or publisher) to access, view, and/or interact with a webpage or website hosted at the server(s) 104.

In some embodiments, though not illustrated in FIG. 1, the composite utility score distribution system 106 may have a different arrangement of components and/or may have a different number or set of components altogether. For example, the user client devices 112 and the publisher computing device 110 can communicate directly, bypassing the server(s) 104 and/or the network 102. The composite utility score distribution system 106 can be implemented in a variety of different ways across the publisher computing device 110, the server(s) 105, and the client devices 112.

By way of example, in one or more embodiments, the composite utility score distribution system 106 provides (e.g., via the server(s) 104) a GUI to the publisher computing device 110. The GUI includes a display of event categories as well as input fields (e.g., slider bars, radio buttons, check boxes, text fields, etc.) for defining a significance of each event category. From the GUI provided to the publisher computing device 110, the composite utility score distribution system 106 receives (e.g., via the server(s) 104) an indication of the significance of each of a number of event categories from the publisher computing device 110. Using the significance of the event categories, the composite utility score distribution system 106 analyzes activity of a number of users to determine a composite utility score for each user.

Furthermore, the composite utility score distribution system 106 calculates a training composite utility score for a training user (e.g., user 116a). Using the training composite utility score for the training user (as well as other training users), the composite utility score distribution system 106 determines a correlation between various training composite utility scores and user characteristics of the training users who have those scores. For instance, the composite utility score distribution system 106 trains a machine learning model to predict user characteristics that correspond to training composite utility scores.

By training a machine learning model, the composite utility score distribution system 106 generates a predictive model whereby the composite utility score distribution system 106 can predict which users of a given set of users (e.g., within the set of subscribers of a social networking system) will have a given composite utility score (e.g., a composite utility score above a particular threshold). Based on this prediction, the composite utility score distribution system 106 can suggest a target audience and/or provide digital content to client devices of additional users.

For example, the server(s) 104 can receive an impression opportunity from the client device 112n (i.e., a new user). In response, the server(s) 104 can perform an online auction (e.g., via an auction server) and generate bids from a plurality of publishers based on campaign parameters for each publisher. In generating these bids, the server(s) 104 can apply trained machine learning models specific to each publisher to predict whether the user 116n of the client device 112n is likely to have a high composite utility score for the publisher. For example, the server(s) 104 can compare user characteristics of the user 116n to target user characteristics generated by a machine learning model for the publisher. Similarly, the server(s) 104 can apply the machine learning model to the user characteristics of the user 116n to predict a composite utility score specific to the user and the publisher.

The server(s) 104 can then determine a bid amount and/or provide digital content (e.g., based on the predicted composite utility score and/or the comparison between user characteristics of the user 116n and target user characteristics identified via the machine learning algorithm). For example, the online auction server may determine a tier-based bidding scale where, according to the preferences set by the digital content publisher, a bid of a certain monetary value (e.g., $0.40) applies to users whose composite utility score is within a certain range (e.g., between 70 and 80), whereas a bid of a different monetary value (e.g., $0.50) applies to users whose composite utility score within a different range (e.g., between 80 and 90), and so on.

The server(s) 104 can identify a winning bid for the impression opportunity associated with the user client device 112n. The server(s) 104 can then provide digital content corresponding to the winning bidder (e.g., the winning publisher) to the user client device 112a.

Accordingly, in one or more embodiments, the composite utility score distribution system 106 can analyze user characteristics of additional users (e.g., new users) and predict or approximate a composite utility score for the additional users based on their user characteristics. Moreover, the composite utility score distribution system 106 can provide digital content to a target audience composed of those users who are predicted to be beneficial to a publisher by distributing digital advertisements by way of user client devices.

The composite utility score distribution system 106 can further train a machine learning model, based on a number of digital content campaigns, to predict a set of event categories and corresponding significances of those event categories that will result in a successful digital content campaigns. Thus, the composite utility score distribution system 106 can suggest to publishers a set of advertising campaign parameters including significance ratings for each of a number of event categories to generate a successful digital content campaign.

Figure 2:
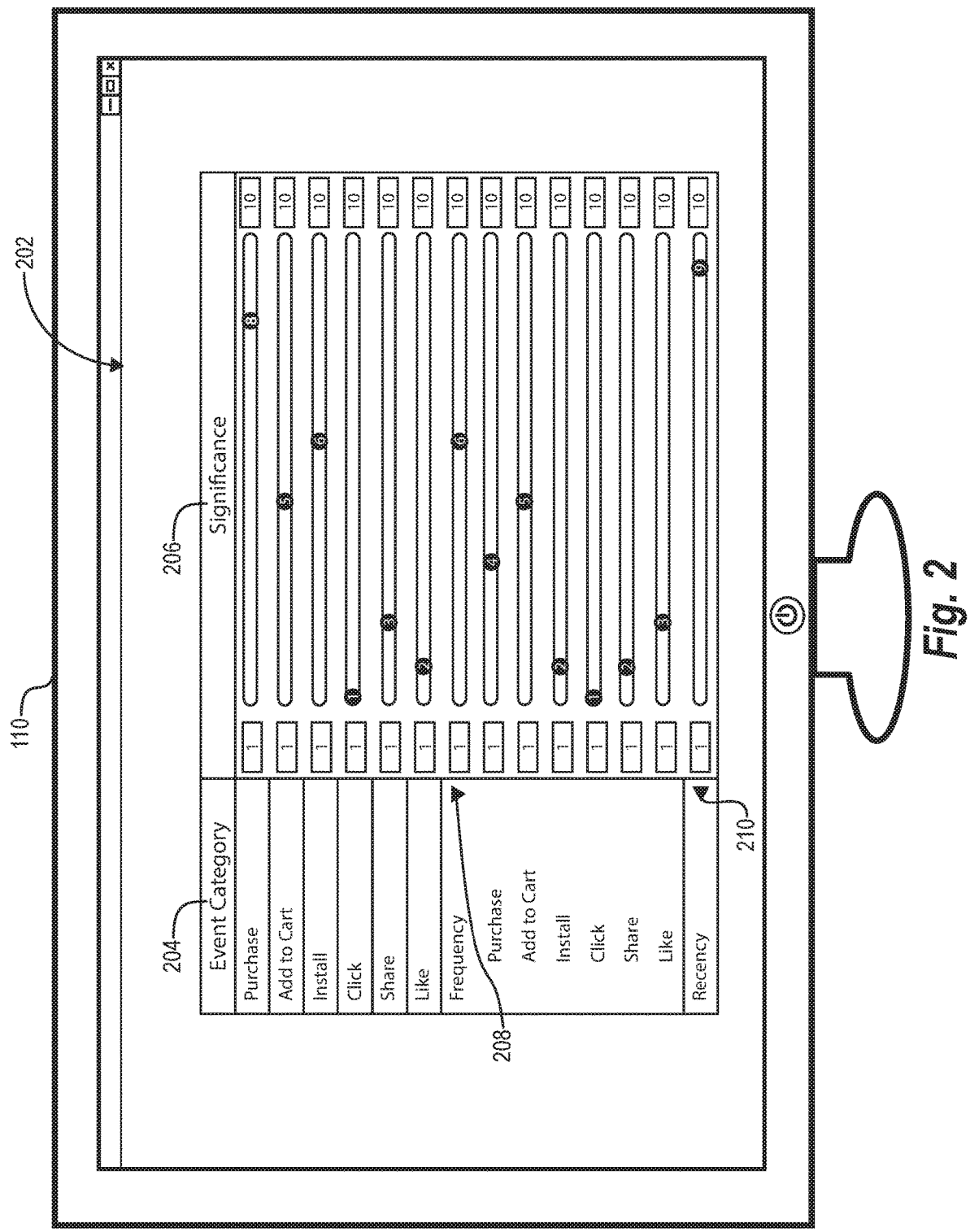
FIG. 2 illustrates a publisher computing device including a graphical user interface with elements for identifying event categories and significance of event categories in accordance with one or more embodiments.

As described above, in one or more embodiments the composite utility score distribution system 106 identifies event categories and corresponding significance ratings by providing a GUI to a publisher by way of the publisher computing device 110. For example, FIG. 2 illustrates an exemplary embodiment of the publisher computing device 110 displaying a GUI 202 that includes various event categories and corresponding significance ratings. Particularly, the GUI 202 includes an event category column 204 including a list of event categories and a significance portion 206 including selectable elements that allow an operator or publisher to input significance ratings for each listed event category.

As shown in FIG. 2, the GUI 202 includes an event category column 204. The event category column 204 includes a listing of various event categories. For example, an event category can include, but is not necessarily limited to, purchases, add-to-cart events, installs, clicks, shares, likes, a frequency of an event, and/or a recency of an event. As used herein, the term "purchase" refers to a financial or other transaction to acquire (e.g., buy) a good or service in exchange for currency, points, or other credit. Additionally, the term "add to cart" refers to an action whereby a user adds an item (e.g., a good or service) to a digital online shopping cart (e.g., with the intent to purchase). The term "install" refers to an action whereby a user initiates and/or finishes the installation of a software program (e.g., a mobile application). Furthermore, the term "click" refers to an action of a user clicking, selecting, tapping, touching, pressing, or otherwise interacting with a particular link, icon, or other digital content item (e.g., advertisement). The term "share" refers to an action of a user utilizing a networking application (e.g., the networking application 114) to share or otherwise distribute a picture, video, link, or other digital content item (e.g., advertisement). Additionally, the term "like" refers to an action of a user indicating user interest in digital content, such as selecting a "like" element corresponding to a social networking system, commenting, or otherwise reacting digital content.

Furthermore, the term "frequency" refers to a frequency (e.g., a number of times within a given time period) of occurrence of events from a particular event category. In circumstances where significance of frequency is high, the composite utility score distribution system 106 can emphasize users that participate in events frequently over users that participate in events less frequently.

A frequency may be averaged for a given time period. For example, the composite utility score distribution system 106 may determine how many times on average that a user (e.g., user 116a) has performed a purchase event within a week, a month, a year, or some other time period. If user 116a performs a purchase event four times in one week and then performs a purchase event six times the next week, the composite utility score distribution system 106 may average the events to determine that the frequency of purchases for user 116a is five purchases per week. In other embodiments, however, the composite utility score distribution system 106 does not average the frequency of events over multiple intervals but instead determines a frequency from a single sample period (e.g., a sample week, month, year, etc.). Accordingly, the frequency of events from an event category may change from one period to another.

In addition, the term "recency" refers to one or more periods of time since one or more events have taken place. For example, recency may refer to a time that has elapsed since user 116a last clicked on an advertisement. In circumstances where the significance if recency is high, the composite utility score distribution system 106 can compare the relative time of events and emphasize those events performed later in time (i.e., closer to the present time).

Though not illustrated in FIG. 2, the GUI 202 may include a parameter or setting by which a publisher can select a time period over which to determine the frequency of events from an event category. For example, in some embodiments the GUI 202 includes a drop-down menu of user-selectable options such as "per week," "per month," or "per year." Depending on which option the publisher selects, the composite utility score distribution system 106 determines a corresponding frequency in accordance with the selected time period.

Likewise, the GUI 202 may include a setting for determining a recency of events from an event category. For example, the GUI 202 may include a drop-down menu including user selectable options such as "one week," "one month," or "one year." The composite utility score distribution system 106 may determine the recency of events that have occurred within the selected time period and de-emphasize (or ignore) events that have occurred outside the selected timeframe. In this way, the composite utility score distribution system 106 provides a means whereby the publisher can apply a recency analysis for only those time periods that the publisher deems important. Thus, the publisher can instruct (via setting the time parameter) the composite utility score distribution system 106 to ignore or de-emphasize irrelevant timing of events where, for example, a user (e.g., user 116a) has not performed any events for more than a month.

Returning to FIG. 2, the event category column 204 includes each of the above-mentioned event categories. In addition to event categories, the GUI 202 further includes nested menus 208 and 210. Nested menus 208 and 210 are menus that, in response to selection by the administrator or operator associated with the publisher, expand to reveal nested items. To illustrate from FIG. 2, the nested menu 208 is expanded whereas nested menu 210 is collapsed (e.g., not expanded). As shown in FIG. 2, nested menu 208 reveals a display of each event category (purchase, add to cart, install, click, share, and like) within a sub-menu of the frequency event category. In contrast, the collapsed nested menu 210 does not reveal the sub-menu of event categories. In response to detecting a user selection, however, the composite utility score distribution system 106 expands the nested menu 210 to reveal the sub-menu of event categories, similar to those displayed in FIG. 2 under the frequency event category.

In some embodiments, the composite utility score distribution system 106 does not provide means whereby a publisher inputs significance ratings for the sub-categories within the nested menus 208 and 210. Instead, the composite utility score distribution system 106 provides a single checkbox for each event category which indicates whether the publisher considers the frequency of the given event category important to a given digital content campaign.

By providing the nested menus 208 and 210, the composite utility score distribution system 106 enables a publisher to select a significance rating of the frequency and/or recency of each of a number of event categories. Indeed, as illustrated in FIG. 2, the GUI 202 includes a slider bar for each event category within the nested menu 208.

As shown in FIG. 2, the GUI 202 includes a significance portion 206. The significance portion 206 of FIG. 2 provides a slider bar corresponding to each event category listed within the event category column 204. In addition, the significance portion 206 includes a minimum input box and a maximum input box whereby a publisher can set a minimum significance rating and a maximum significance rating. Thus, the slider bar can adjust the significance rating between the minimum value and maximum value. Accordingly, the publisher can define a range for significance ratings for each event category. Indeed, the publisher may set different ranges for each event category depending on how granular the publisher wishes to define the significance ratings.

As shown, the publisher administrator can adjust the slider for each of the event categories, where a location of the slider on the slider bar represents a significance rating of the event category. In some embodiments, a higher significance rating means that the corresponding event category is more significant to the publisher.

To illustrate from FIG. 2, the GUI 202 shows that the publisher has selected a significance rating of "8" for the event category of "purchase," while the "add to cart" category has a significance rating of "5," "install" has a rating of "6," "click" has a rating of "1," "share" has a rating of "3," and "like" has a rating of "2." Accordingly, the composite utility score distribution system 106 determines that purchases are the most significant event category, followed by installs, add-to-cart events, shares, likes, and then clicks. Additionally, the composite utility score distribution system 106 may not only determine a relative significance of each event category based on the selected ratings (e.g., the order of significance of the event categories), but may further determine a weight of the significance of each event category based on the selected ratings.

As will be described in further detail below in relation to FIG. 3, the composite utility score distribution system 106 applies each of the weights to corresponding event category scores for each event category. To illustrate, the composite utility score distribution system 106 multiplies a weight by a corresponding event category score, and further sums each multiplied weight and event category score together to determine a composite utility score for a given user (e.g., user 116a).

Although FIG. 2 illustrates particular event categories within the GUI 202, the composite utility score distribution system 106 can utilize a variety of different event categories. For example, in one or more embodiments, the composite utility score distribution system 106 utilizes one or more influence events (e.g., events that reflect a user's social media influence) and corresponding significance ratings. For instance, the GUI 202 can include one or more influence events such as "friends" a user has added, "followers" a user has obtained, or "likes" a user has received. Moreover, a publisher can select significance ratings corresponding to the one or more influence events.

As described above, the composite utility score distribution system 106 determines the significance of a number of event categories by way of the GUI 202. In other embodiments, the composite utility score distribution system 106 determines the significance of an event category via an alternate method than the slider bars of the GUI 202. For example, in some embodiments, the composite utility score distribution system 106 provides, by way of the GUI 202, a ranking method whereby a publisher can order the event categories relative to each other, where those listed first (or last) are the most significant. Alternatively, the composite utility score distribution system 106 may provide an input field for each event category whereby a publisher can input a number that represents the significance of an event category. Additionally, the composite utility score distribution system 106 may provide constraints (e.g., a formula) that restrict the input of the publisher such that the sum of all of the weights added to together must equal a particular total (e.g., 1, 10, 100, etc.). For example, in a case where the publisher selects three event categories for a particular advertising campaign—"purchase," "install," and "like"—the composite utility score distribution system 106 may require that the publisher input (or select) significance ratings that add up to 1, such as 0.7, 0.2, and 0.1, respectively. Regardless, the composite utility score distribution system 106 enables the publisher to set the significance rating of each event category for optimizing a digital content campaign.

While FIG. 2 illustrates a particular layout of the GUI 202, it will be appreciated that the GUI 202 may have additional or alternative layouts. For instance, the GUI 202 may include additional or alternative elements/sections therein. Indeed, in some embodiments the GUI 202 includes a field whereby an publisher (e.g., by way of an operator or administrator operating the publisher computing device 110) enters a custom event category that is not already included within the GUI 202. In addition, the GUI 202 may include an alternative method by which a publisher enters the significance rating of each event category, as described above.

As mentioned above, the composite utility score distribution system 106 utilizes the significance ratings of each event category to determine a composite utility score for a given user (e.g., user 116a). FIG. 3 provides a depiction of a sequence of acts by which the composite utility score distribution system 106 calculates the composite utility score. In particular, FIG. 3 illustrates an act 302 of identifying the significance of each event category. More specifically, the act 302 can involve detecting the input received from the publisher by way of GUI 202 of FIG. 2. Indeed, as described above, the composite utility score distribution system 106 detects a selection (or other input) of a significance rating for one or more event categories, such as those depicted in GUI 202.

The composite utility score distribution system 106 can determine a significance rating in various additional or alternative ways as well. In particular, the composite utility score distribution system 106 can determine a significance rating based on a true value of business score (e.g., reflecting on one or more of a monetary long-term value, a long-term return on advertising spending ("ROAS"), or a custom performance metric specific to a given publisher). The composite utility score distribution system 106 can further consider a variety of short-term event occurrences. For instance, as mentioned above, based on the true value of business score and/or the short-term event occurrences, the composite utility score distribution system 106 can implement a prediction model (e.g., a regression model, a clustering model, and/or a classification model) to generate features and corresponding coefficients as significance ratings. For example, the composite utility score distribution system 106 can implement a machine learning model using the true value of business score as a dependent variable and the short-term event occurrences as independent variables, whereupon the model outputs features with corresponding coefficients that the composite utility score distribution system 106 can use as significance ratings. Additional detail regarding a specific implementation of such a machine learning model is discussed below in relation to FIG. 9.

Figure 3:
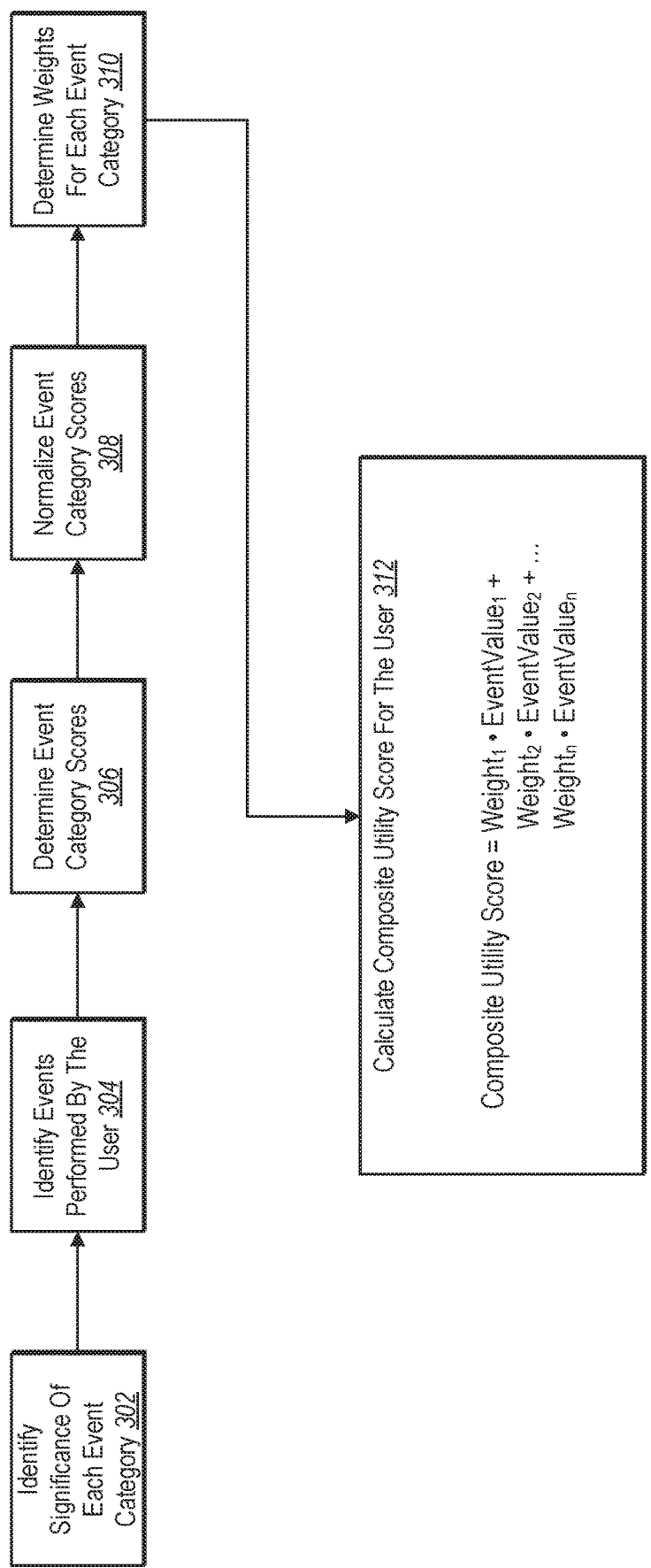
FIG. 3 illustrates an example flow diagram of determining composite utility scores in accordance with one or more embodiments.

In addition, as shown in FIG. 3, the composite utility score distribution system 106 also performs an act 304 of identifying events performed by a user (e.g., the user 116a). To identify the events performed by the user 116a, the composite utility score distribution system 106 analyzes the user activity repository 108. In particular, the composite utility score distribution system 106 identifies past actions that the user 116a has performed that are recorded (e.g., by the composite utility score distribution system 106) in one or more user activity logs. For example, the composite utility score distribution system 106 identifies previous purchases, add-to-cart events, installs, clicks, shares, and likes that the user 116a has performed. Accordingly, in one or more embodiments, the act 304 includes monitoring user activity to identify events performed by one or more users and identifying users that have performed one or more of the event categories identified in relation to FIG. 2.

Beyond identifying previous events that the user 116a has performed, the composite utility score distribution system 106 also determines a time at which a given event was performed. To illustrate, the composite utility score distribution system 106 analyzes a date and time at which the user 116a performed a number of previous purchases.

By determining the time of various events, the composite utility score distribution system 106 may further determine a time period during which the user 116a performed various events. For example, to determine a frequency of purchases (or other event category), the composite utility score distribution system 106 analyzes a user activity repository 108 to determine an average number of purchases the user 116a has made within a given interval or time period, as described above. Similarly, to determine a recency of a purchase (or other event), the composite utility score distribution system 106 determines how much time has elapsed since one or more purchases made by the user 116a.

FIG. 3 further illustrates an act 306 of determining event category scores. In particular, the act 306 can involve determining an event category score for each event category shown in FIG. 2. Indeed, upon identifying users that have performed one or more events corresponding to identified event categories, the composite utility score distribution system 106 can determine an event category score. As mentioned above, an event category score refers to a value or numerical representation of events performed by a user within an event category. For example, the composite utility score distribution system 106 can determine a total dollar amount of purchases made by a user (e.g., user 116a) or an average dollar amount of purchases made by a user. In other examples, the composite utility score distribution system 106 can determine an event category score that reflects to a number of items added to a digital shopping cart.

As mentioned above, in some embodiments, an event category score refers to a numerical representation of an influence of an event. To illustrate, the composite utility score distribution system 106 can determine an influence value of user 116a by determining a number of friends and/or followers (e.g., co-users of a social networking system) of the user 116a and/or a number (e.g., an average number or total number) of views that the user 116a receives for posts, shares, or other social networking interactions. Thus, an event category score can refer to a numerical representation of an influence of an event.

FIG. 3 further illustrates an act 308 of normalizing the event category scores. In particular, the act 308 can involve implementing a normalization technique to compare different event category scores. The composite utility score distribution system 106 normalizes the event category scores by utilizing one of a number of normalization techniques. In some embodiments, the composite utility score distribution system 106 normalizes the event category scores based on a highest and/or lowest event category score identified from a repository of user activities. For example, the composite utility score distribution system 106 can determine, from among the users 116, a highest event category score for each event category and a lowest event category for each event category and then normalize the users linearly between the highest and lowest event category scores.

To illustrate by example, the composite utility score distribution system 106 determines that user 116a has a highest event category score for the purchases event category with 65 total purchases. The composite utility score distribution system 106 further determines that user 116b has a lowest event category score for the purchases event category with 3 total purchases. Furthermore, the composite utility score distribution system 106 normalizes the purchases event category score of each of users 116 by applying a linear normalization between 3 and 65. For example, the composite utility score distribution system 106 can apply the following equation:

$$X' = \frac{X - X_{min}}{X_{max} - X_{min}}$$

where X is a given event category score, X' is a normalized event category score, $X_{min}$ is the minimum event category score for the given event category, and $X_{max}$ is the maximum event category score for the given event category.

In other embodiments, the composite utility score distribution system 106 normalizes the event category scores (act 308) by determining a percentile placement of each user. For example, the composite utility score distribution system 106 determines event category scores for each user (act 306) and, for a given user 116a, further calculates a percentage of the users 116 whose event category score is below (or above, in other cases) the event category score of the user 116a for a given event category. Normalizing event category scores using this method may be represented by:

$$X' = \frac{N_{below}}{T} \text{ or } X' = \frac{N_{above}}{T}$$

where X' is the normalized event category score, $N_{below}$ is the number of users 116 whose event category score is below the event category score of the given user (e.g., user 116a), $N_{above}$ is the number of users 116 whose event category score is above the event category score of the given user, and T is the total number of users 116.

As further illustrated in FIG. 3, the composite utility score distribution system 106 performs an act 310 of determining weights for each event category. As used herein, the term "weight" refers to a numerical representation of the significance of an event category. In particular, weight includes a numerical representation of significance utilized to determine a composite utility score for a user.

To determine weights of each event category, the composite utility score distribution system 106 implements one of a number of weighting schemes. For example, in some embodiments, the composite utility score distribution system 106 weights each event category on a scale from 0 to 1, where the total weights add together to equal 1. To illustrate, if the publisher selects adjusts three sliders within the GUI 202 of FIG. 2—to select a "6" for "purchase," a "3" for "install," and a "1" for "click," then in some embodiments the composite utility score distribution system 106 weights the event category "purchase" at 0.6, "install" at 0.3, and "click" at 0.1, where 0.6+0.3+0.1=1. In other examples, the composite utility score distribution system 106 weights the event categories from 0 to 1, but does not necessarily require that the sum of the weights be equal to 1. Indeed, the composite utility score distribution system 106 may utilize the significance ratings as input by the publisher by way of GUI 202 as the weights for each event category. Thus, from FIG. 2, the composite utility score distribution system 106 weights "purchase" at 0.8, "add to cart" at 0.5, "install" at 0.6, "click" at 0.1, "share" at 0.3, "like" at 0.2, "frequency" at 0.6, and "recency" at 0.9.

In one or more embodiments, the composite utility score distribution system 106 weights each event category on a scale from 1 to 10. Indeed, as described above in relation to FIG. 2, the composite utility score distribution system 106 receives user input to set a significance of each event category listed in the event category column 204. In some embodiments, the composite utility score distribution system 106 utilizes the significance ratings indicated in the GUI 202 as the weights for each event category. For example, the composite utility score distribution system 106 determines that a weight for "purchase" is 8, "add to cart" is 5, and so on as shown in FIG. 2.

As mentioned above in relation to FIG. 2, the composite utility score distribution system 106 further determines weights that correspond to significance ratings with regard to the nested menus 208 and 210. To elaborate, in some embodiments the composite utility score distribution system 106 applies a frequency significance rating with regard to a frequency event category. For instance, the composite utility score distribution system 106 can apply a weight of 4 to all purchases made within the previous month.

As illustrated in FIG. 2, in some embodiments the composite utility score distribution system 106 includes an overall frequency weight and individual frequency weights for sub-categories. Thus, as illustrated in FIG. 2, the overarching significance rating for frequency is 6, and each sub-category within the nested menu 208 each have their own individual significance ratings. In one or more embodiments, the composite utility score distribution system 106 applies both the overarching significance for frequency (or recency) as well as individual significance ratings to the sub-categories in determining a weight.

By way of example, the composite utility score distribution system 106 may calculate the weight of a given sub-category by:

$$W_i = \frac{F_{combined} * F_i}{F_{total}}$$

where $F_{combined}$ is the over-arching significance rating (e.g., the significance rating of the over-arching frequency or recency event category), $W_i$ is the weight of a given sub-category (e.g., frequency of purchase, etc.), F total is the sum of the significance ratings of the sub-categories, and $F_i$ is the significance rating of the given sub-category. To illustrate by example, the composite utility score distribution system 106 calculates a weight of the frequency of purchases using the following values for the variables in the above equation: $F_{combined}=6$, $F_i=4$, and $F_{total}=4+5+2+1+2+3=17$. Accordingly, the composite utility score distribution system 106 may calculate the weight of the frequency of purchases for a given user (e.g., user 116a) to be $W_j=6*4/17=1.41$.

As shown in FIG. 3, the composite utility score distribution system 106 also performs an act 312 of calculating a composite utility score for a user (e.g., the user 116a). In particular, the composite utility score distribution system 106 calculates a composite utility score by summing a weighted event category scores, as illustrated in FIG. 3.

For example, the composite utility score distribution system 106 applies a weight to each event category score for which the user 116a has performed a corresponding event. The composite utility score distribution system 106 adds each weighted event category score together to obtain a composite utility score for the user 116a. As an example, the composite utility score distribution system 106 multiplies a first event category score by a first weight, a second event category score by a second weight, and so on for each relevant event category score of the user. The composite utility score distribution system 106 further sums each of the resultant products together.

To illustrate using the significance ratings of FIG. 2, the composite utility score distribution system 106 may multiply a weight of 8 by a total number of purchases made by the user 116a, a weight of 5 by a total number of add-to-cart events, a weight of 6 by a total number of installs, a weight of 1 by a total number of clicks, a weight of 3 by a total number of shares, a weight of 2 by a total number of likes, a weight of 6 by a frequency of events from an event category, and a weight of 9 by a recency of events. In addition, the composite utility score distribution system 106 may add the weighted event category scores together to equal a composite utility score for the user 116a.

Figure 4:
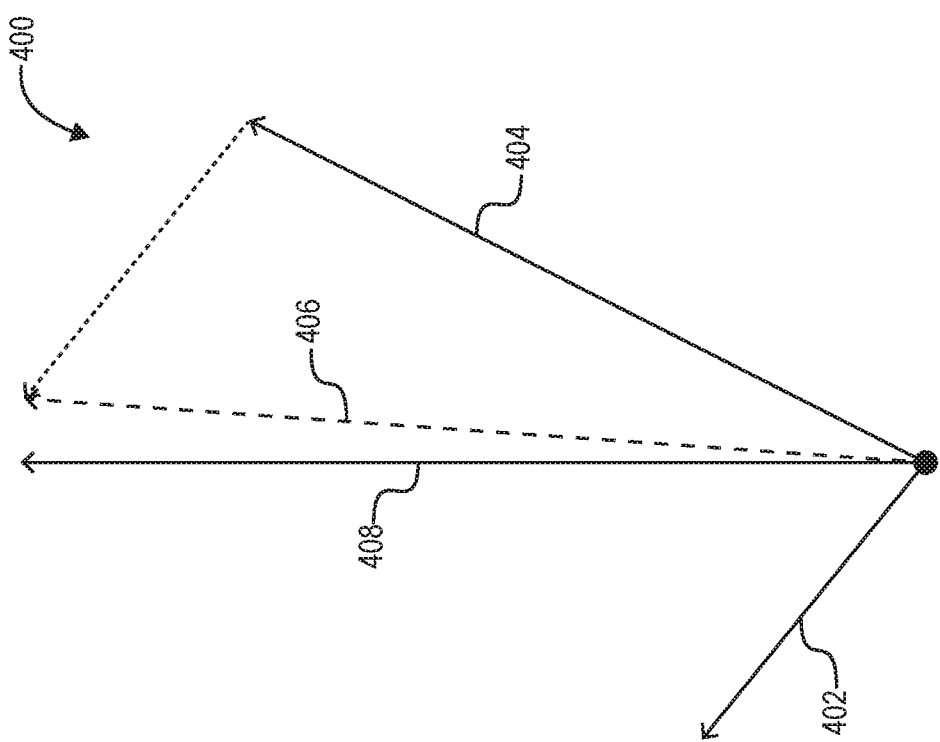
FIG. 4 illustrates an example vector diagram illustrating increased overall value in accordance with one or more embodiments.

As mentioned above, by determining a composite utility score using multiple event categories and corresponding weights, the composite utility score distribution system 106 is more accurate than conventional advertising systems. For example, FIG. 4 illustrates a vector representation of the increased accuracy of the composite utility score distribution system 106 in determining total value to a publisher. In particular, FIG. 4 illustrates a vector representation 400 of a true value vector 408 reflecting the true value (to a publisher) of providing digital content a particular user. The vectors 402, 404 represent value corresponding to particular event categories. For example, the vector 402 reflects value derived from potential purchases by the user and the vector 404 reflects value derived from user potentially sharing digital content (or adding a product to a cart).

As shown, considering only one of the vectors 402, 404 captures only a portion of the true value vector 408. Indeed, the vector 402 is not very close in direction or magnitude to the vector 408, and thus, alone, is not a very good representation of the true value of the user 116a. In some embodiments, the vector 402 represents a mid-funnel event category (e.g., an event category that is not closely or directly related to conversions which are often ignored by conventional systems). Similarly, considering only the vector 404 fails to provide an accurate reflection of the true value vector 408. Vector 404 may represent a low-funnel event category (e.g., an event category more directly related to conversions) that has a stronger correlation to the true value than the vector 402, but alone is still not an accurate representation of the true value vector 408.

Combining the vectors 402, 404, however, results in a much more accurate approximation of the true value vector 408. Indeed, as illustrated in FIG. 4, the combined vector 406 reflects a combination of the vectors 402, 404 and the combined vector 406 is a much closer approximation to the true value vector 408 in both magnitude and direction.

In one or more embodiments, the vector 406 reflects a composite utility score. Indeed, as just described in FIG. 3, the composite utility score distribution system 106 combines individual event category scores (i.e., the individual vectors 402, 404) to generate a composite utility score (e.g., the combined vector 06). Like the vectors 402, 404, individual event category scores in isolation may fail to approximate the total value (or total utility) of providing digital content to a particular user. By combining event category scores to generate a combined utility score, the composite utility score distribution system 106 can more accurately approximate the total utility to a publisher for providing digital content to any particular user.

As seen from the illustration in FIG. 4, the composite utility score distribution system 106 more accurately approximates the true value of a user. For instance, unlike conventional digital content distribution systems that generally focus just on low-funnel events (e.g., events that are more likely to lead directly to conversions or purchases), the composite utility score distribution system 106 considers both low-funnel events and mid-funnel events (e.g., events that more indirectly lead to conversions or purchases). Thus, the composite utility score distribution system 106 generates a more accurate approximation of a user's true value by considering multiple aspects that combine to make up the true long-term value of a user to a publisher.

Figure 5:
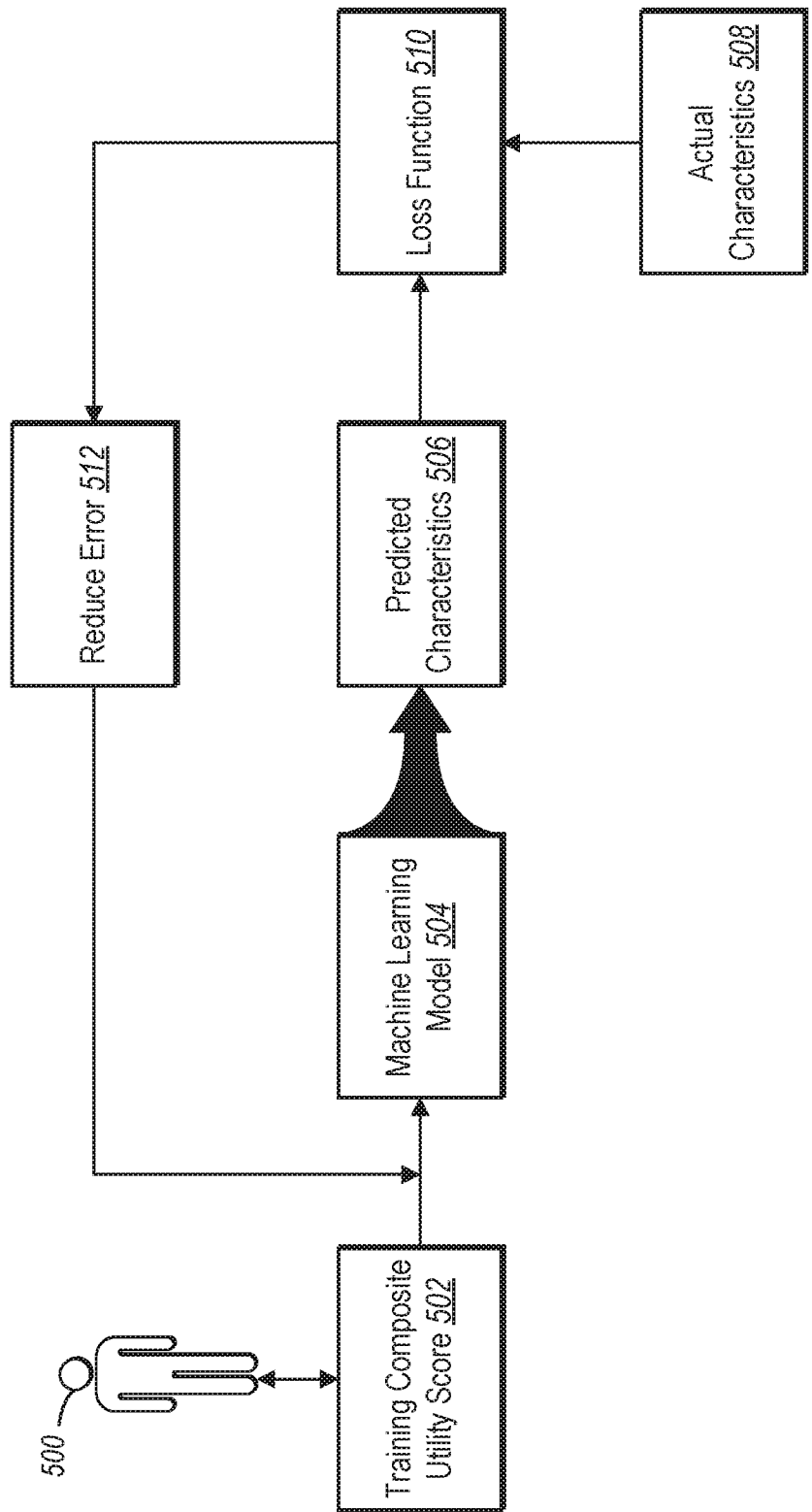
FIG. 5 illustrates an example flow diagram of training a machine learning model in accordance with one or more embodiments.
Figure 6:
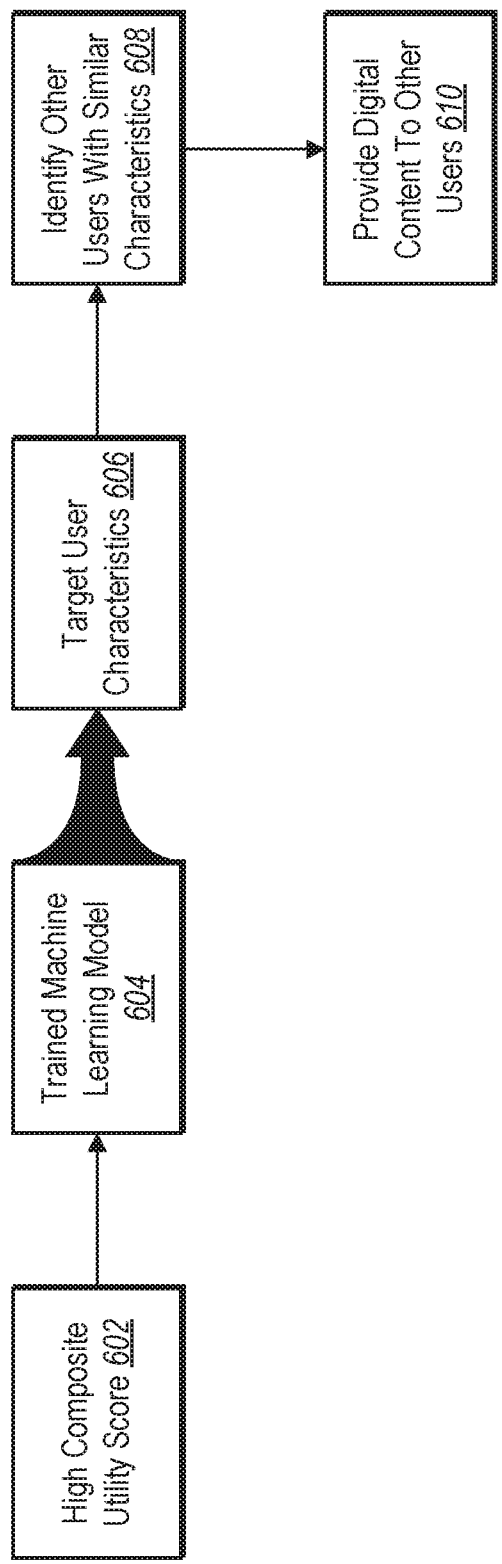
FIG. 6 illustrates an example flow diagram of utilizing a trained machine learning model to provide digital content to other users in accordance with one or more embodiments.
Figure 7:
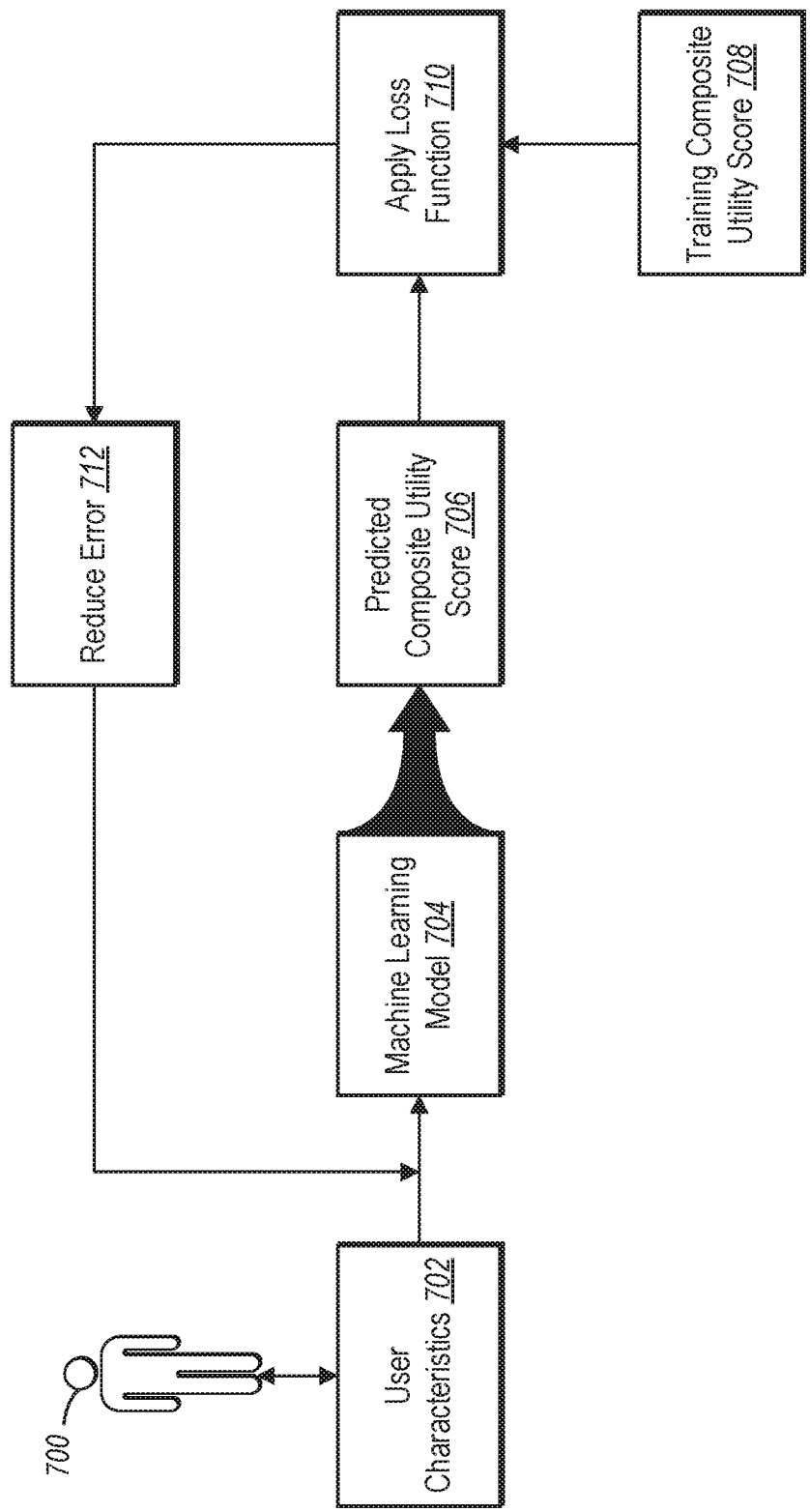
FIG. 7 illustrates an example flow diagram of training a machine learning model in accordance with one or more embodiments.

Additional detail will now be provided regarding various approaches to training and utilizing a machine learning model in accordance with one or more embodiments of the composite utility score distribution system 106. In particular, FIGS. 5 and 6 illustrate training a machine learning model to predict target user characteristics and then utilizing the target user characteristics to provide targeted digital content to client devices of additional users. Moreover, FIGS. 6 and 7 illustrate training a machine learning model to predict composite utility scores, utilizing the trained machine learning model to predict composite utility scores of additional users, and providing digital content to users based on the predicted composite utility scores.

Specifically, FIG. 5 illustrates training a machine learning model to predict user characteristics in accordance with one or more embodiments of the composite utility score distribution system 106. In particular, as shown in FIG. 5, the composite utility score distribution system 106 trains the machine learning model 504 using a training composite utility score 502 for a training user 500 as well as actual characteristics 508 of the training user 500.

To elaborate, the composite utility score distribution system 106 identifies the training user 500 by analyzing a repository of user activities. Specifically, as discussed in relation to FIG. 3, the composite utility score distribution system 106 analyzes a repository of user activities based on event categories identified by a publisher to identify the training user 500 (i.e., a user that has performed one or more events corresponding to one or more of event categories identified as significant by a publisher).

Furthermore, as shown in FIG. 5, the composite utility score distribution system 106 generates a training composite utility score 502 for the training user 500. Indeed, as described in relation to FIG. 3, the composite utility score distribution system 106 generates the training composite utility score 502 by determining event category scores corresponding to the events performed by the training user 500 and applying significance scores (e.g., applying weights) to the determined event category scores.

Moreover, as shown in FIG. 5, the composite utility score distribution system 106 provides the training composite utility score 502 to the machine learning model 504 (i.e., applies the machine learning model 504 to the training composite utility score 502). As illustrated, the machine learning model 504 analyzes the training composite utility score 502 to generate predicted characteristics 506 of the training user 500.

In addition, the composite utility score distribution system 106 trains the machine learning model 504 by comparing the predicted characteristics 506 with the actual characteristics 508. Specifically, the composite utility score distribution system 106 performs an act 510 of applying a loss function. By applying the loss function, the composite utility score distribution system 106 determines a measure of loss (e.g., a difference or measure of error) between the actual characteristics 508 of the training user 500 and the predicted characteristics 506. For example, the composite utility score distribution system 106 may apply any of a number of appropriate loss functions such as a Bayesian loss function, a risk function, a quadratic loss function, or a utility function.

As shown, the composite utility score distribution system 106 can train the machine learning model 504 based on the determined loss (or error) between the actual characteristics 508 of the training user 500 and the predicted characteristics 506. In particular, the composite utility score distribution system 106 further performs the act 512 of reducing the error determined by the loss function. For instance, the composite utility score distribution system 106 can modify parameters of the machine learning model 504 to reduce the difference between the predicted characteristics 506 and the actual characteristics 508 corresponding to the training user 500. To illustrate, in one or more embodiments, the composite utility score distribution system 106 performs one of a number of error reduction techniques such as mean squared error reduction or standard error reduction.

Furthermore, in one or more embodiments, the composite utility score distribution system 106 repeats the process illustrated in FIG. 5. Indeed, the composite utility score distribution system 106 can identify a second training user, determine a second composite utility score corresponding to the second training user, predict user characteristics based on the second training composite utility score utilizing the machine learning model 504, compare actual user characteristics of the second training user with the predicted user characteristics, and train the machine learning model based on the comparison. Indeed, the composite utility score distribution system 106 can repeatedly train the machine learning model 504 utilizing a plurality of different training users. As the composite utility score distribution system 106 repeats the process illustrated in FIG. 5, the predicted characteristics 506 become more and more accurate—i.e., closer to the actual characteristics 508.

In some embodiments, the composite utility score distribution system 106 implements the process depicted in FIG. 5 for composite utility scores above a particular threshold (e.g., high composite utility scores). In other embodiments, the composite utility score distribution system 106 implements the process for a different range of composite utility scores. Indeed, the composite utility score distribution system 106 may perform the process for each composite utility score for users 116 to train a machine learning model 504 to predict user characteristics that correspond to composite utility scores in a number of ranges (e.g., low, medium, and high).

The composite utility score distribution system 106 can further utilize a machine learning model (e.g., the machine learning model 504) to identify other users with high composite utility scores. For instance, the composite utility score distribution system 106 can utilize the machine learning model 504 to identify target user characteristics that correspond to users with high composite utility scores. The composite utility score distribution system 106 can then identify other users that match the target user characteristics. For example, FIG. 6 illustrates applying a machine learning model to identify target user characteristics and then providing digital content to additional users based on the target user characteristics.

As illustrated in FIG. 6, the composite utility score distribution system 106 inputs a high composite utility score 602 (i.e., a composite utility score above a particular threshold) into a trained machine learning model 604. The composite utility score distribution system 106 predicts, via the trained machine learning model 604, targeted user characteristics 606 corresponding to the high composite utility score 602. Based on the targeted user characteristics 606, the composite utility score distribution system 106 performs the act 608 of identifying other users with similar user characteristics.

To identify other users with similar user characteristics to the target user characteristics 606, the composite utility score distribution system 106 analyzes profile information, demographic information, and/or geographic information associated with a plurality of other users. In some embodiments, the composite utility score distribution system 106 determines that some users have user characteristics that are within a threshold similarity of the predicted user characteristics 606.

As mentioned above, the composite utility score distribution system 106 can train a real-time delivery machine learning model or a targeting machine learning model. Indeed, the trained machine learning model 604 can represent either a real-time delivery machine learning model or a targeting machine learning model. Accordingly, the composite utility score distribution system 106 can determine which users to distribute digital content to in a real-time bidding scenario, and the composite utility score distribution system 106 can also (or alternatively) determine which users to target. For example, the composite utility score distribution system 106 can determine which users to distribute digital content to and/or which users to target based on composite utility scores, as described above.

As further illustrated in FIG. 6, the composite utility score distribution system 106 performs act 610 of providing digital content to other users. In particular, the composite utility score distribution system 106 provides digital content (e.g., advertisements) to those users whose user characteristics are similar to (e.g., within a threshold similarity of) the predicted target user characteristics 606. By providing digital content to users with user characteristics that are similar to the predicted user characteristics 606, the composite utility score distribution system 106 targets users for an advertising campaign who are likely to provide value (e.g., monetary value, social value, exposure value, etc.) to a publisher.

For example, in some embodiments, the composite utility score distribution system 106 identifies an impression opportunity associated with a user client device 112a. For instance, the composite utility score distribution system 106 monitors user activity associated with the user client device 112a to identify impression opportunities. In addition, the composite utility score distribution system 106 conducts an auction to determine a winning bid for the identified impression opportunity. For example, the composite utility score distribution system 106 determines a bid amount associated with a particular composite utility score.

The composite utility score distribution system 106 can determine a bid (or whether to bid) utilizing a machine learning model. Specifically, the composite utility score distribution system 106 can determine a bid by applying a machine learning model to generate a composite utility score for the user 116a associated with the identified impression opportunity. Moreover, the composite utility score distribution system 106 can determine a bid amount based on the determined composite utility score (e.g., increase the bid for an increase composite utility score). Moreover, the composite utility score distribution system 106 can determine a winning (e.g., highest) bid and provides digital content received from the digital content publisher who had the winning bid to the user client device 112a.

As mentioned above, in one or more embodiments, the composite utility score distribution system 106 can also train a machine learning model to predict composite utility scores. Indeed, FIG. 7 illustrates training a machine learning model 704 to predict composite utility scores based on user characteristics of a training user in accordance with one or more embodiments of the composite utility score distribution system 106.

As illustrated in FIG. 7, the composite utility score distribution system 106 identifies a training user 700 with a set of user characteristics 702. As described above, the composite utility score distribution system 106 can apply the training user 700 by searching a repository of user actions for users that have performed events from event categories identified as significant to a publisher.

In addition to identifying the training user 700, the composite utility score distribution system 106 also determines a training composite utility score 708 corresponding to the training user 700. As described above, the composite utility score distribution system 106 can identify events performed by the training user 700, calculate event category scores based on the events, and apply weights to the event category scores to generate a training composite utility score for the training user 700.

In addition, as shown in FIG. 7, the composite utility score distribution system utilizes a machine learning model 704 to analyze the user characteristics 702. Specifically, the composite utility score distribution system 106, via the machine learning model 704, analyzes the user characteristics 702 to generate a predicted composite utility score 706.

Furthermore, the composite utility score distribution system 106 compares the predicted composite utility score 706 with the training composite utility score 708 to train the machine learning model 704. Specifically, as shown, the composite utility score distribution system 106 performs the act 710 of applying a loss function to determine a loss (e.g., a difference or measure of error) for the predicted composite utility score 706 as compared to the actual composite utility score 708 of the training user 600. The composite utility score distribution system 106 further performs the act 712 of reducing the error (e.g., the loss determined by the loss function). In particular, based on the loss determined by the loss function from act 710, the composite utility score distribution system 106 implements an error reduction technique.

Additionally, the composite utility score distribution system 106 repeats the process of illustrated in FIG. 7 by identifying additional training users, identifying additional sets of user characteristics for the training users, calculating additional training composite scores for the additional training users, providing the additional sets of user characteristics to the machine learning model, generating additional predicted composite scores, and comparing the additional predicted composite scores with the additional training composite scores. As the composite utility score distribution system 106 repeats the process, the machine learning model 704 becomes more accurate, and the composite utility score distribution system 106 predicts composite utility scores that more closely resemble training composite utility scores.

Figure 8:
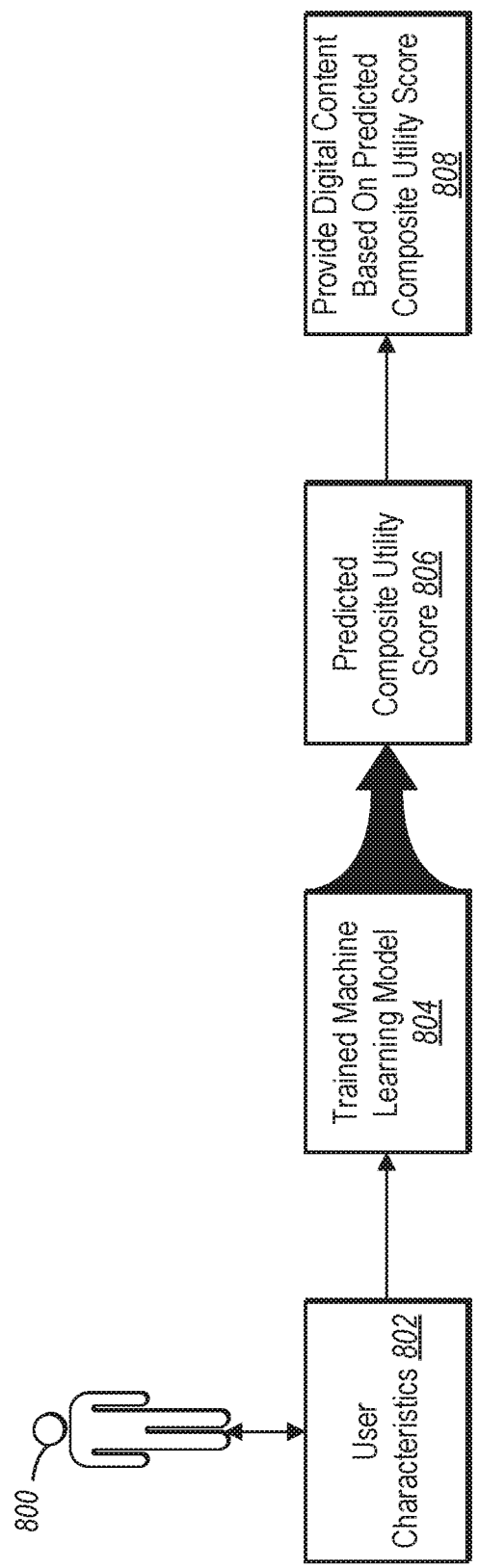
FIG. 8 illustrates an example flow diagram of utilizing a trained machine learning model to provide digital content to other users in accordance with one or more embodiments.

As mentioned, the composite utility score distribution system 106 can also utilize a trained neural network to predict composite utility scores for new users and provide digital content based on the predicted composite utility scores. For example, FIG. 8 illustrates predicting composite utility scores for additional users and providing digital content based on the predicted composite utility scores in accordance with one or more embodiments of the composite utility score distribution system 106. Specifically, the composite utility score distribution system 106 utilizes a trained machine learning model 804 to analyze user characteristics 802 of a user 800 and generate a predicted composite utility score 806 for the user 800. The composite utility score distribution system 106 then provides digital content based on the predicted composite utility score 806 (e.g., by determining whether the predicted composite utility score satisfies a threshold).

As shown, the composite utility score distribution system 106 identifies an additional user 800 with corresponding user characteristics 802. For example, the composite utility score distribution system 106 can identify an impression opportunity corresponding to the additional user 800. To illustrate, the composite utility score distribution system 106 can determine that a client device corresponding to the user 800 is utilizing a networking application with a slot for targeted digital content. The composite utility score distribution system 106 can access a user profile to determine the user characteristics 802 of the user 800.

As illustrated in FIG. 8, the composite utility score distribution system 106 then applies the machine learning model 804 to the user characteristics 802 of the user 800. Specifically, the composite utility score distribution system 106 predicts, via the trained machine learning model 804, a composite utility score 806 for the user 800 based on the user characteristics 802.

Furthermore, the composite utility score distribution system 106 then performs the act 808 of providing digital content to the user 800 (i.e., a client device of the user 800) based on the predicted composite utility score 806. In particular, the composite utility score distribution system 106 can determine whether to provide digital content to the user 800 (or how much to pay to provide the digital content to the user 800) based on whether the predicted composite utility score 806 satisfies a composite utility score threshold.

For instance, in one or more embodiments, the composite utility score distribution system 106 provides a bid for an impression opportunity corresponding to the user 800 based on the predicted composite utility score 806. Specifically, the composite utility score distribution system 106 can provide a bid (or set a bid amount) based on a determination that the predicted composite utility score 806 for the user 800 satisfies a threshold (e.g., place a higher bid when the composite utility score is above a threshold value, place a lower bid when the composite utility score is below a threshold value, and/or place no bid when the composite utility score is below a second threshold value).

In some embodiments, the composite utility score distribution system 106 provides a tier-based bidding method. For instance, the composite utility score distribution system 106 provides a bid of a particular amount (e.g., a particular monetary value) based on a determination that the predicted composite utility score 806 for the user 800 is within a range of composite utility scores. To illustrate, the composite utility score distribution system 106 provides a bid of $0.50 based determining a composite utility score between 80 and 90, and provides a bid of $0.40 based on determining a composite utility score between 70 and 80. Accordingly, the composite utility score distribution system 106 may provide a bid that corresponds to a range of composite utility scores.

The act 808 can also include transmitting one or more digital content items to client devices (e.g., mobile devices) associated with the user 800. For example, upon winning an impression opportunity via an online auction, the composite utility score distribution system 106 can transmit a digital content item to the client device associated with the user 800.

Figure 9:
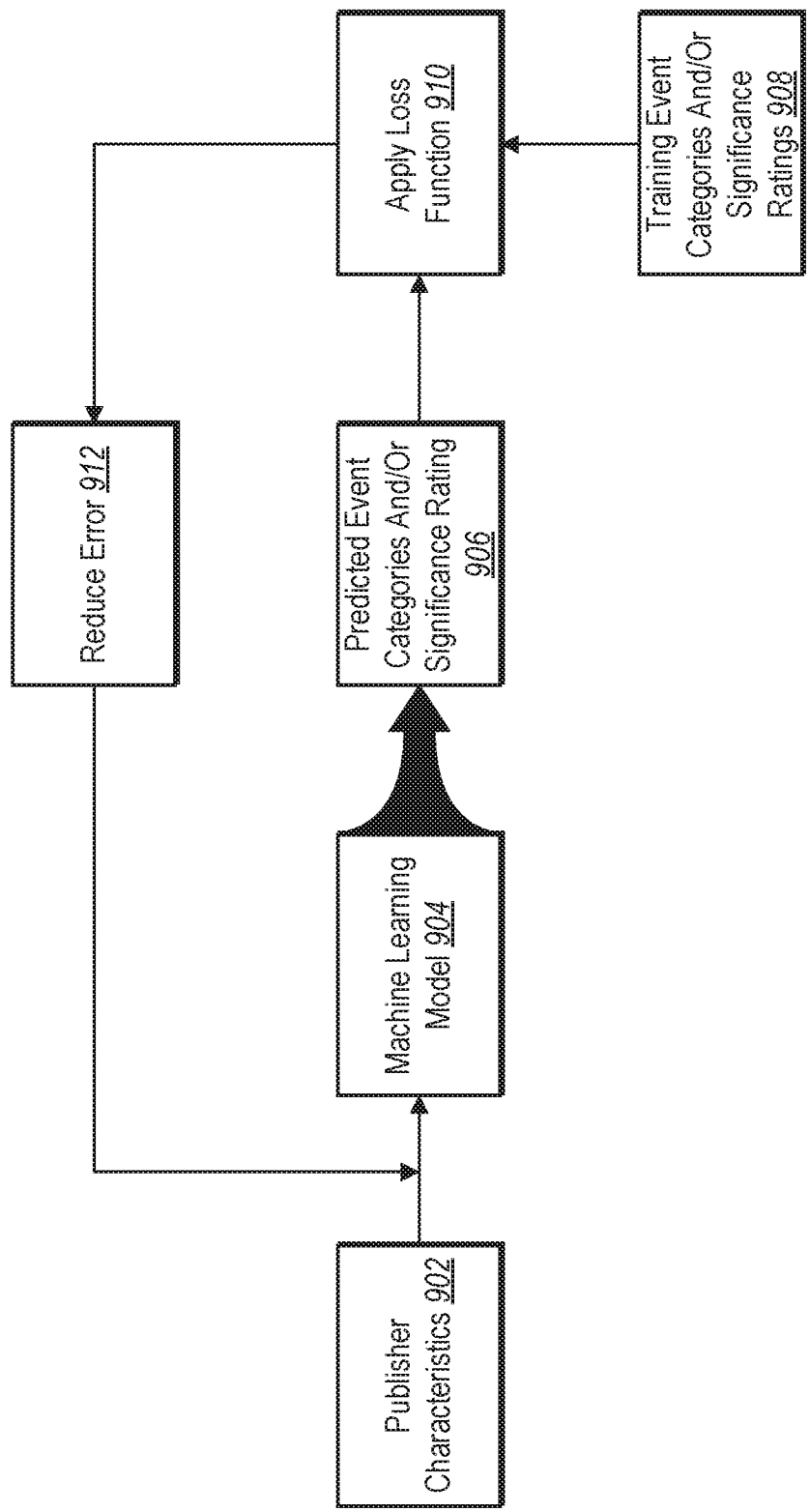
FIG. 9 illustrates an example flow diagram of training a machine learning model in accordance with one or more embodiments.

In addition to training a machine learning model to predict user characteristics (e.g., as in FIG. 5) or to predict composite utility scores (e.g., as in FIG. 7), the composite utility score distribution system 106 may further train a machine learning model to predict event categories and corresponding significance ratings. As illustrated in FIG. 9, the composite utility score distribution system 106 trains a machine learning model 904 to predict event categories and/or significance ratings based on publisher characteristics 902. As used herein, the term "publisher characteristics" refers to characteristics or attributes associated with a digital content publisher. In particular, the term publisher characteristics includes attribute of a publisher or attributes of a digital content campaign (e.g., campaign parameters) corresponding to the publisher. For example, publisher characteristics can include, but are not necessarily limited to various campaign parameters such as a target audience, distribution channels (e.g., social media providers or particular websites), advertising budgets, digital content (e.g., contents of advertisements). Similarly, the publisher characteristics can include other attributes of the publisher, such as size (e.g., number of employees) of a publisher, geographic location, or type of goods or services.

In addition, publisher characteristics can also include a measure of true value for the publisher. For example, publisher characteristics can include a true value score, such as monetary long-term value, long-term ROAS, or another value defined for a particular publisher.

To determine the publisher characteristics 902, the composite utility score distribution system 106 analyzes information associated with a publisher including, for example, publisher profile information, previous campaign budgets, previous target audiences, and/or previous distribution channels. Similarly, the composite utility score distribution system 106 can determine long-term value of particular campaigns, long-term ROAS, or other measure values. Alternatively, the composite utility score distribution system 106 receives an indication of publisher characteristics 902 from the publisher. For example, the composite utility score distribution system 106 may receive information pertaining to publisher characteristics via a GUI provided to the publisher computing device 110.

In any case, the composite utility score distribution system 106 trains the machine learning model 904 by providing publisher characteristics 902 to the machine learning model 904 as shown in FIG. 9. Based on the publisher characteristics 902, the machine learning model generates predicted event categories and/or significance ratings 906 that correspond to the publisher characteristics 902. Similar to the above discussion in relation to FIGS. 5 and 7, the composite utility score distribution system 106 performs act 910 of applying a loss function to determine a loss between the predicted event categories and/or significance ratings 906 and the actual event categories and/or significance ratings 908 associated with the publisher (e.g., short term event occurrences for a particular publisher in one or more digital content campaigns and/or significance ratings/event categories previously selected by a publisher).

The composite utility score distribution system 106 further performs act 912 of reducing the error of the loss function. As described above, the composite utility score distribution system 106 can implement one of a number of appropriate error reduction techniques based on means squared error, standard error, or some other type of error. Accordingly, the composite utility score distribution system 106 repeats the process illustrated in FIG. 9 to train the machine learning model 904 and generate more accurate predicted event categories and/or significance ratings 906.

Specifically, based on the measure of loss, the digital content overlay system 106 can modify features and weights (e.g., coefficients) within the machine learning model 904 to reduce the loss function. By modifying these features and weights, the digital content overlay system 106 can determine significant event categories and/or significance ratings (e.g., significance ratings and/or events that correspond to high true value results for any particular publisher).

Upon training a machine learning model 904 to predict event categories and/or significance ratings, the composite utility score distribution system 106 can utilize the trained machine learning model to suggest event categories and/or significance ratings to a new publisher. For example, the composite utility score distribution system 106 may receive an indication that a new publisher desires to initiate an digital content campaign. Upon determining publisher characteristics associated with the new publisher, the composite utility score distribution system 106 may apply the trained machine learning model to the publisher characteristics to generate suggested event categories and/or significance ratings corresponding to the event categories. Moreover, the composite utility score distribution system 106 can provide a recommendation to the new publisher of which event categories and corresponding significance ratings the new publisher should select to optimize a digital content campaign.

Figure 10:
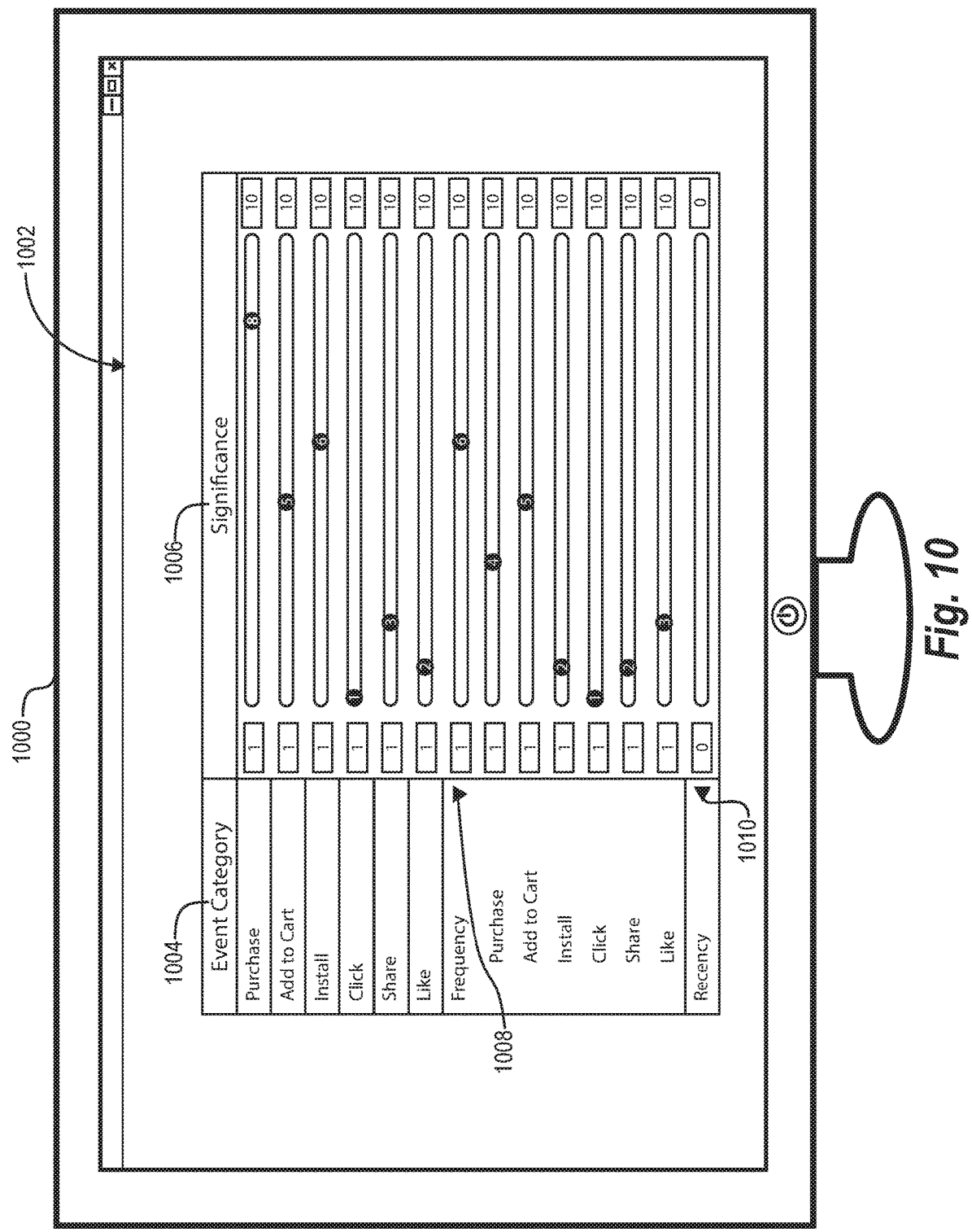
FIG. 10 illustrates an example publisher client device including a graphical user interface for providing recommended event categories and recommended significance of the event categories in accordance with one or more embodiments.

Indeed, as illustrated in FIG. 10, the composite utility score distribution system 106 provides a GUI 1002 to a publisher computing device 1000 associated with the new publisher. In particular, the GUI 1002 includes suggested or recommended event categories and corresponding significance ratings for the new publisher. For instance, the GUI 1002 includes an event category column 1004 and a significance section 1006. As shown in the GUI 1002, the composite utility score distribution system 106 provides recommended event category significance ratings as follows: purchase at 8, add to cart at 5, install at 6, click at 1, share at 3, like at 2, and frequency at 6.

The GUI 1002 further includes nested menus 1008 and 1010. In particular, as shown in FIG. 10, the composite utility score distribution system 106 provides significance ratings for the frequency event category, including a number of sub-categories, of GUI 1002. To illustrate, the composite utility score distribution system 106 recommends an overall frequency rating of 6, and further recommends frequency sub-category significance ratings (as described above) as follows: purchase at 4, add to cart 5, install at 2, click at 1, share at 2, and like at 3.

Furthermore, the composite utility score distribution system 106 recommends that the new publisher not include recency as an event category. Indeed, as shown in FIG. 10, the GUI 1002 shows that the minimum rating for recency is "0" and the maximum rating is also "0." Therefore, based on using publisher characteristics to predict event categories and significance ratings via a machine learning model, the composite utility score distribution system 106 provides recommended event categories and corresponding significance ratings to the new publisher (e.g., by way of the publisher computing device 1000).

Figure 11:
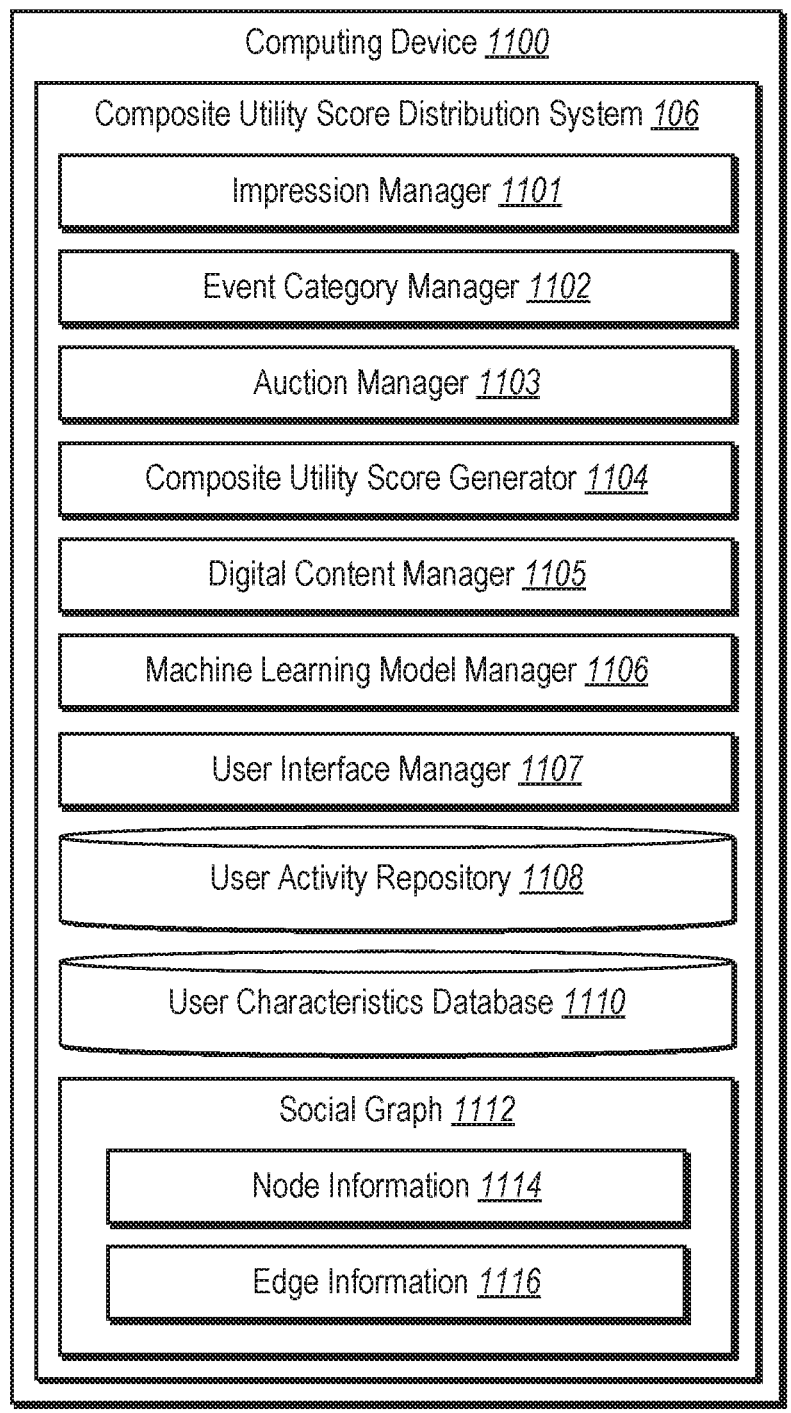
FIG. 11 illustrates an example schematic diagram of a composite utility score distribution system in accordance with one or more embodiments.

Turning now to FIG. 11, additional detail will be provided regarding components and capabilities of the composite utility score distribution system 106. Specifically, FIG. 11 illustrates an example schematic diagram of the composite utility score distribution system 106 on an exemplary computing device 1100 (e.g., the server(s) 104, the publisher computing device 110, and/or the user client devices 112). As shown in FIG. 11, the composite utility score distribution system 106 may include an impression manager 1101, an event category manager 1102, an auction manager 1103, a composite utility score generator 1104, a digital content manager 1105, a machine learning model manager 1106, a user interface manager 1107, a user activity repository 1108, a user characteristics database 1110, and a social graph 1112. While FIG. 11 depicts a particular number of components, in some embodiments, the composite utility score distribution system 106 may include more or fewer components. In addition, the components may perform additional or alternative tasks than those described hereafter.

As mentioned, the composite utility score distribution system 106 includes an impression manager 1101. In particular, the impression manager 1101 can detect, identify, or determine impression opportunities associated with one or more user client devices 112. For example, the impression manager 1101 can detect user activity associated with a user client device 112a and can communicate with an auction manager 1103 to initiate a bidding process to determine digital content to provide to the user client device 112a, as described above.

Indeed, the composite utility score distribution system 106 includes an auction manager 1103. The auction manager 1103 can manage, facilitate, orchestrate, or implement an auction process to determine a winning bid associated with a given impression opportunity. For instance, the auction manager 1103 can determine a bid amount that corresponds to a given composite utility score, as described above. In addition, the auction manager 1103 can determine which bid from among a plurality of bids is the winning (e.g., highest) bid.

As also mentioned, the composite utility score distribution system 106 includes an event category manager 1102. In particular, the event category manager 1102 can determine, by way of a GUI provided to a publisher computing device, whereby a publisher can input significance ratings for various event categories. The event category manager 1102 can further receive (e.g., by way of the GUI), access, or otherwise identify the significance ratings of each event category. Based on the significance ratings, the event category manager 1102 can also determine and/or apply weights associated with each event category. Furthermore, the event category manager 1102 can determine event category scores for each event category (e.g., by accessing the user activity repository 1108 to analyze user activity), as described above. The event category manager 1102 can also normalize the event category scores, as described above.

As also mentioned above, the composite utility score distribution system 106 includes a composite utility score generator 1104. In particular, the composite utility score generator 1104 can generate, determine, calculate, or compute a composite utility score for a given user based on event category scores and weights, in accordance with the description provided above.

The composite utility score distribution system 106 further includes a digital content manager 1105. In particular, the digital content manager 1105 can provide, transfer, or transmit digital content to a user client device (e.g., user client device 112a). For example, based on an impression opportunity associated with the user client device 112a, the digital content manager 1105 can communicate with the auction manager 1103 to provide digital content associated with a digital content provider who had the winning bid to the user client device 112a.

Furthermore, the composite utility score distribution system 106 includes a machine learning model manager 1106. The machine learning model manager 1106 can train a machine learning model based on training composite utility scores to predict target user characteristics. The machine learning model manager 1106 can further train a machine learning model based on user characteristics to predict composite utility scores for users. In addition, the machine learning model manager 1106 can train a machine learning model based on publisher characteristics (including digital content campaign parameters) to predict event categories and corresponding significance ratings of those event categories.

The machine learning model manager 1106 can also apply a trained machine learning model. For example, the machine learning model manager 1106 can apply a machine learning model to identify target user characteristics for users likely to have composite utility values above a threshold. Similarly, the machine learning model manager 1106 can apply a machine learning model to user characteristics to predict a composite utility value for the user. Similarly, the machine learning model manager 1106 can apply a machine learning model to publisher characteristics to predict event categories and significance ratings.

The computing device 1100 can further include a user interface manager 1107. The user interface manager 1107 can provide a GUI to a publisher based on predictions of user characteristics and/or composite utility scores. In particular, the user interface manager 1107 can provide a GUI to a publisher (e.g., via a publisher computing device) by which the composite utility score distribution system 106 can suggest or recommend event categories and corresponding significance ratings to the publisher for a given digital content campaign. The user interface manager 1107 can also provide a GUI to a content publisher whereby a content publisher can select significance ratings for various event categories, as described above.

Similar to the above discussion in relation to FIG. 1, the composite utility score distribution system 106 further includes a user activity repository 1108. The user activity repository 1108 stores, maintains, and provides access to records of user activity associated with individual users. Additionally, the composite utility score distribution system 106 includes a user characteristics database 1110. The user characteristics database 1110 stores, maintains, and provides access to user information including profile information, demographic information, geographic information, or other information as described herein.

The composite utility score distribution system 106 further includes a social graph 1112. The social graph 1112 can include node information 1114 and edge information 1116. To elaborate, the social graph 1112 can include node information 1114 that stores information comprising nodes for users, nodes for concepts, and/or nodes for content items. In addition, the social graph 1112 can include edge information 1116 comprising relationships between nodes and/or actions occurring within the social-networking system. Further detail regarding social-networking systems, social graphs, edges, and nodes is presented below.

One or more of the above-mentioned components of the composite utility score distribution system 106 can communicate with other components via an appropriate communications protocol. For example, the event category manager 1102 can communicate with the composite utility score generator 1104 to provide information pertaining to significance ratings for each respective event category. Additionally, the composite utility score generator 1104 can communicate with the social graph 1112 to access user activity information and/or user profile information to store in the user activity repository 1108 or the user characteristics database 1110, and to use in determining composite utility scores for various users.

Figure 12:
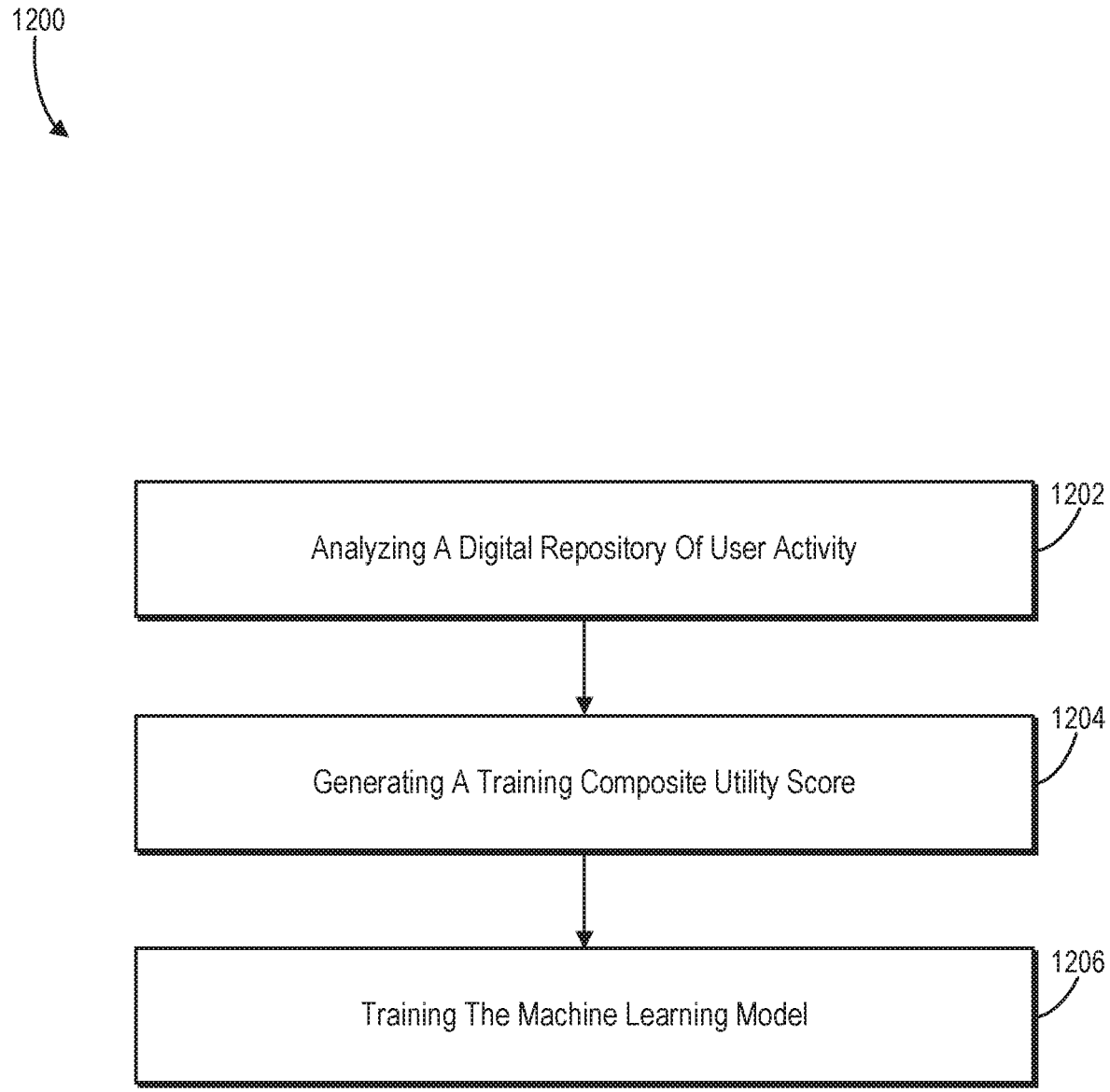
FIG. 12 illustrates a flowchart of a series of acts in a method of utilizing a machine learning model to provide digital content to users in accordance with one or more embodiments.

FIGS. 1-11, the corresponding text, and the examples provide a number of different systems and methods for providing digital content to users based on composite utility scores. In addition to the foregoing, embodiments can also be described in terms of flowcharts comprising acts steps in a method for accomplishing a particular result. For example, turning now to FIG. 12, this figure illustrates a flowchart of a series of acts 1200 of utilizing a machine learning model to provide digital content to a target audience of users. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12.

As illustrated in FIG. 12, the series of acts 1200 may include generating a machine learning model for providing targeted digital content to computing devices by way of an act 1202 of analyzing a digital repository of user activity. In particular, the act 1202 can include analyzing a digital repository of user activity to identify a training user that has performed one or more events from the first event category and one or more events from the second event category, wherein the training user has a corresponding set of user characteristics. A first event category can include a purchase event category. A second event category can include an add-to-cart event category. Accordingly, the one or more events from the first event category can include one or more purchases by the training user, and the one or more events from the second event category can include one or more instances of the user adding an item to a digital shopping cart. Alternatively, the first event category can include one or more of: purchases, add-to-cart events, installs, clicks, shares, likes, a frequency of event, or a recency of event.

The series of acts 1200 may further include an act 1204 of generating a training composite utility score. In particular, the act 1204 can include generating a training composite utility score for the training user by applying the first significance to the one or more events from the first event category performed by the training user and the second significance to the one or more events from the second event category performed by the training user. The act 1204 can involve determining a first event category score corresponding to the one or more events from the first event category performed by the training user and a second event category score corresponding to the one or more events from the second event category performed by the training use, and can also involve applying a first weight corresponding to the first significance to the first event category score and a second weight corresponding to the second significance to the second event category score. The act 1204 can include determining a first event category score corresponding to the one or more events from the first event category performed by the training user and a second event category score corresponding to the one or more events from the second event category performed by the training user, and can further include applying a first weight corresponding to the first significance to the first event category score and a second weight corresponding to the second significance to the second event category score.

Determining the first event category score can include determining at least one of: a number of events from the first event category performed by the training user or a monetary value associated with the one or more events from the first event category performed by the training user. Furthermore, the series of acts 1200 can include an act of normalizing the first event category score by comparing the first event category score associated with the training user with additional first event category scores associated with the additional users.

As illustrated in FIG. 12, the series of acts 1200 may still further include an act 1206 of training the machine learning model. In particular, the act 1206 can include training the machine learning model based on the training composite utility score and the corresponding set of user characteristics of the training user. The act 1206 can involve applying the machine learning model to the training composite utility score for the training user to generate a predicted set of user characteristics for the training user, and training the machine learning model based on a difference between the predicted set of user characteristics and the set of user characteristics corresponding to the training user.

Training the machine learning model can involve applying the machine learning model to the set of user characteristics corresponding to the training user to generate a predicted composite utility score for the training user, and can further involve training the machine learning model by comparing the predicted composite utility score and the training composite utility score for the training user. Training the machine learning model can further involve applying the machine learning model to the training composite utility score for the training user to generate a predicted set of user characteristics for the training user, as well as training the machine learning model based on a difference between the predicted set of user characteristics and the set of user characteristics corresponding to the training user. Training the machine learning model can still further involve applying the machine learning model to the set of user characteristics corresponding to the training user to generate a predicted composite utility score for the training user, and training the machine learning model by comparing the predicted composite utility score and the training composite utility score for the training user.

The series of acts 1200 can further include an act of utilizing the machine learning model to provide digital content to a client device of an additional user having a second set of user characteristics. The act of utilizing the machine learning model can include determining, by way of the machine learning model, a set of target user characteristics that correspond to composite utility scores that satisfy a threshold. The act can further include providing the digital content to the client device of the additional user based on a comparison between the set of target user characteristics that correspond to composite utility scores that satisfy the threshold with the second set of user characteristics of the additional user.

Though not illustrated in FIG. 12, the series of acts 1200 can include an act of providing, to the publisher computing device, a user interface comprising one or more selectable significance options, and can further include an act of identifying the significance of the first event category and the significance of the second event category based on user interaction with the one or more selectable significance options.

The series of acts 1200 can further include an act of utilizing the machine learning model. Utilizing the machine learning model can include determining a second set of user characteristics corresponding to the additional user, applying the machine learning model to the second set of user characteristics corresponding to the additional user to determine a predicted composite utility score for the additional user, and providing the digital content to the client device of the additional user based on the predicted composite utility score.

Furthermore, the series of acts 1200 can include an act of providing, to a publisher computing device, a user interface comprising one or more selectable significance options. The series of acts 1200 can further include an act of identifying the significance of the first event category and the significance of the second event category based on user interaction with the one or more selectable significance options. Additionally, the series of acts 1200 can include an act of determining a first event category score associated with the first event category and a second event category score associated with the second event category, wherein first event category score includes one or more of: a total number of events of the first event category that the training user has performed, a monetary value of events of the first event category that the training user has performed, or an influence value associated with the training user.

Additionally, the series of acts 1200 can include an act of identifying the training user by analyzing a digital repository of user activity to determine a number of instances where the user has performed an event from the first event category and a number of instances where the user has performed an event from the second event category. Still further, the series of acts 1200 can include acts of identifying an impression opportunity corresponding to an additional user, and in response to identifying the impression opportunity, utilizing the machine learning model to provide the digital content to a client device of the additional user.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
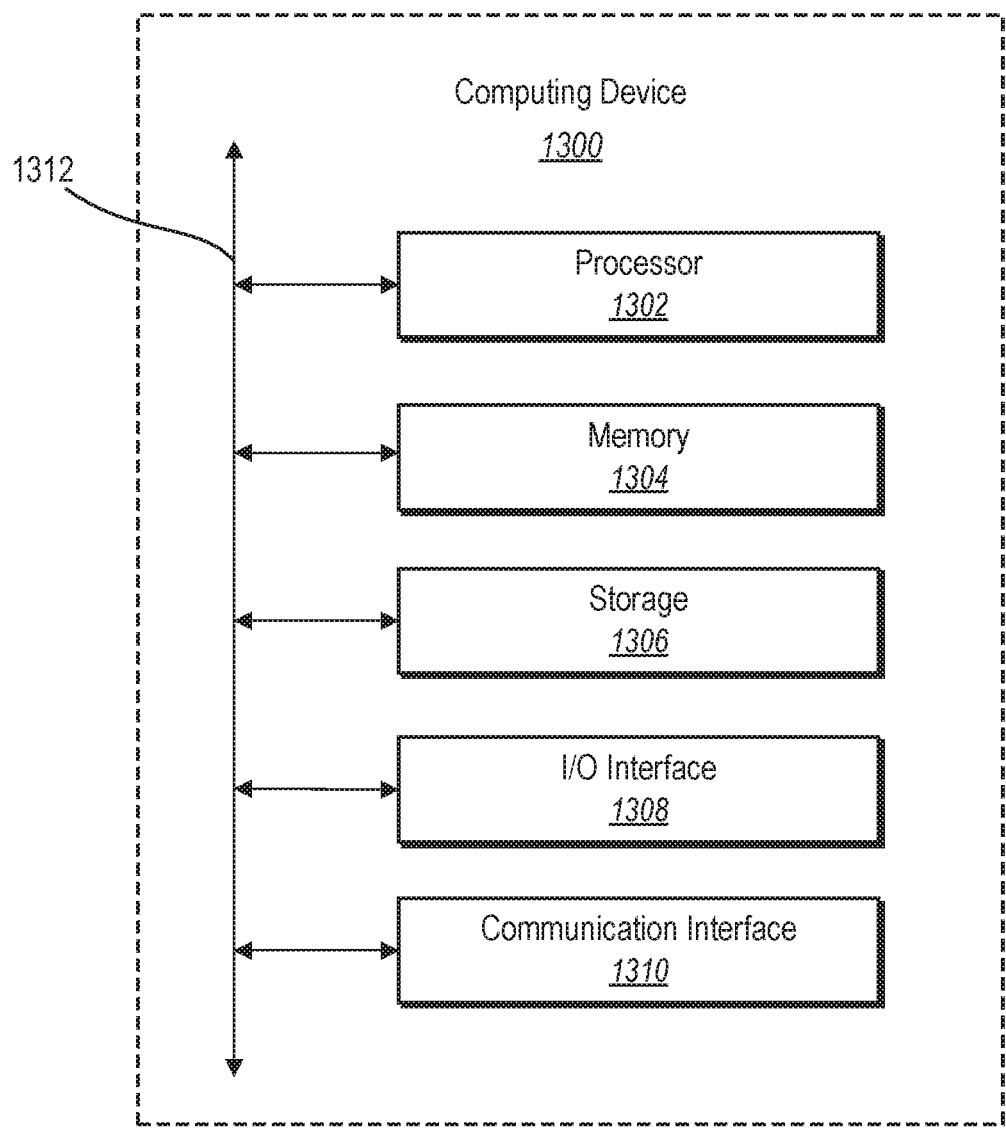
FIG. 13 illustrates a block diagram of an exemplary computing device in accordance with one or more embodiments.

FIG. 13 illustrates a block diagram of exemplary computing device 1300 that may be configured to perform one or more of the processes described above. One will appreciate that the computing device 1300 may represent one or more client devices or server devices, such as those described previously mentioned (e.g., computing device 1100). Further, the computing device 1300 may represent various types of computing devices. For example, the computing device 1300 can include: a mobile device such as a mobile telephone, a smartphone, a PDA, a tablet, a laptop; a non-mobile device such as a desktop or server; or any other type of computing device.

As shown in FIG. 13, the computing device 1300 can comprise a processor 1302, a memory 1304, a storage device 1306, an input/output ("I/O") interface 1308, and a communication interface 1310, which may be communicatively coupled by way of a communication infrastructure 1312. While an exemplary computing device 1300 is shown in FIG. 13, the components illustrated in FIG. 13 are not intended to be limiting. Additional or alternative components may be used in other embodiments. Furthermore, in certain embodiments, the computing device 1300 can include fewer components than those shown in FIG. 13.

In one or more embodiments, the processor 1302 includes hardware for executing instructions, such as those making up a computer program. The memory 1304 may be used for storing data, metadata, and programs for execution by the processor(s). The storage device 1306 includes storage for storing data or instructions.

The I/O interface 1308 allows a user (e.g., content producer or viewer) to provide input to, receive output from, and otherwise transfer data to and receive data from computing device 1300. The I/O interface 1308 may include a mouse, a keypad or a keyboard, a touchscreen, a camera, an optical scanner, network interface, modem, other known I/O devices or a combination of such I/O interfaces. The I/O interface 1308 may also include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the computing device 1300 and one or more other computing devices or networks. As an example, the communication interface 1310 may include a network interface controller (NIC) or network adapter for communicating with an Ethernet or another wire-based network or a wireless NIC (WNIC) or wireless adapter for communicating with a wireless network, such as a WI-FI. The communication infrastructure 1312 may include hardware, software, or both that connects components of the computing device 1300 to each other. As an example, the communication infrastructure 1312 may include one or more types of buses.

As mentioned above, the communications system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

Figure 14:
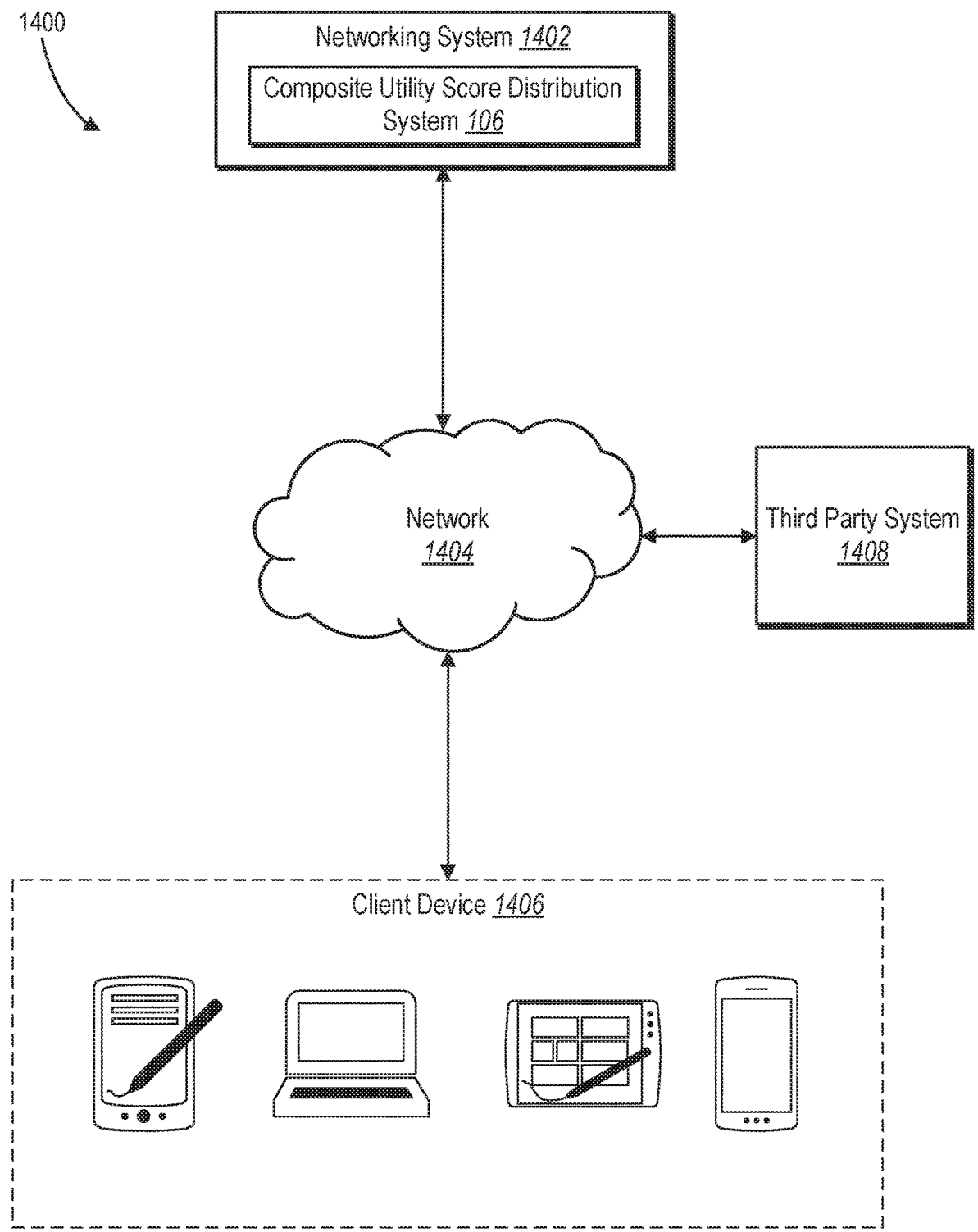
FIG. 14 illustrates an example environment of a networking system having the composite utility score distribution system in accordance with one or more embodiments.

FIG. 14 illustrates an example network environment 1400 of a social networking system. Network environment 1400 includes a client device 1406, a networking system 1402 (e.g., a social networking system and/or an electronic messaging system), and a third-party system 1408 connected to each other by a network 1404. Although FIG. 14 illustrates a particular arrangement of client device 1406, networking system 1402, third-party system 1408, and network 1404, this disclosure contemplates any suitable arrangement of client device 1406, networking system 1402, third-party system 1408, and network 1404. As an example and not by way of limitation, two or more of client device 1406, networking system 1402, and third-party system 1408 may be connected to each other directly, bypassing network 1404. As another example, two or more of client device 1406, networking system 1402, and third-party system 1408 may be physically or logically co-located with each other in whole or in part. Moreover, although FIG. 14 illustrates a particular number of client devices 1406, networking systems 1402, third-party systems 1408, and networks 1404, this disclosure contemplates any suitable number of client devices 1406, networking systems 1402, third-party systems 1408, and networks 1404. As an example and not by way of limitation, network environment 1400 may include multiple client device 1406, networking systems 1402, third-party systems 1408, and networks 1404.

This disclosure contemplates any suitable network 1404. As an example and not by way of limitation, one or more portions of network 1404 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1404 may include one or more networks 1404.

Links may connect client device 1406, networking system 1402, and third-party system 1408 to communication network 1404 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1400. One or more first links may differ in one or more respects from one or more second links.

In particular embodiments, client device 1406 may be an electronic device including hardware, software, or embedded logic components or a combination of two or more such components and capable of carrying out the appropriate functionalities implemented or supported by client device 1406. As an example and not by way of limitation, a client device 1406 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 1406. A client device 1406 may enable a network user at client device 1406 to access network 1404. A client device 1406 may enable its user to communicate with other users at other client devices 1406.

In particular embodiments, client device 1406 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1406 may enter a Uniform Resource Locator (URL) or other address directing the web browser to a particular server (such as server, or a server associated with a third-party system 1408), and the web browser may generate a Hyper Text Transfer Protocol (HTTP) request and communicate the HTTP request to server. The server may accept the HTTP request and communicate to client device 1406 one or more Hyper Text Markup Language (HTML) files responsive to the HTTP request. Client device 1406 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 1402 may be a network-addressable computing system that can host an online social network. Networking system 1402 may generate, store, receive, and send social-networking data, such as, for example, user-profile data, concept-profile data, social-graph information, or other suitable data related to the online social network. Networking system 1402 may be accessed by the other components of network environment 1400 either directly or via network 1404. In particular embodiments, networking system 1402 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 1402 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1406, a networking system 1402, or a third-party system 1408 to manage, retrieve, modify, add, or delete, the information stored in data store.

In particular embodiments, networking system 1402 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 1402 may provide users of the online social network the ability to communicate and interact with other users. In particular embodiments, users may join the online social network via networking system 1402 and then add connections (e.g., relationships) to a number of other users of networking system 1402 that they want to be connected to. Herein, the term "friend" may refer to any other user of networking system 1402 with whom a user has formed a connection, association, or relationship via networking system 1402.

In particular embodiments, networking system 1402 may provide users with the ability to take actions on various types of items or objects, supported by networking system 1402. As an example and not by way of limitation, the items and objects may include groups or social networks to which users of networking system 1402 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 1402 or by an external system of third-party system 1408, which is separate from networking system 1402 and coupled to networking system 1402 via a network 1404.

In particular embodiments, networking system 1402 may be capable of linking a variety of entities. As an example and not by way of limitation, networking system 1402 may enable users to interact with each other as well as receive content from third-party systems 1408 or other entities, or to allow users to interact with these entities through an application programming interfaces (API) or other communication channels.

In particular embodiments, a third-party system 1408 may include one or more types of servers, one or more data stores, one or more interfaces, including but not limited to APIs, one or more web services, one or more content sources, one or more networks, or any other suitable components, e.g., that servers may communicate with. A third-party system 1408 may be operated by a different entity from an entity operating networking system 1402. In particular embodiments, however, networking system 1402 and third-party systems 1408 may operate in conjunction with each other to provide social-networking services to users of networking system 1402 or third-party systems 1408. In this sense, networking system 1402 may provide a platform, or backbone, which other systems, such as third-party systems 1408, may use to provide social-networking services and functionality to users across the Internet.

In particular embodiments, a third-party system 1408 may include a third-party content object provider. A third-party content object provider may include one or more sources of content objects, which may be communicated to a client device 1406. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 1402 also includes user-generated content objects, which may enhance a user's interactions with networking system 1402. User-generated content may include anything a user can add, upload, send, or "post" to networking system 1402. As an example and not by way of limitation, a user communicates posts to networking system 1402 from a client device 1406. Posts may include data such as status updates or other textual data, location information, photos, videos, links, music or other similar data or media. Content may also be added to networking system 1402 by a third-party through a "communication channel," such as a newsfeed or stream.

In particular embodiments, networking system 1402 may include a variety of servers, sub-systems, programs, modules, logs, and data stores. In particular embodiments, networking system 1402 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 1402 may also include suitable components such as network interfaces, security mechanisms, load balancers, failover servers, management-and-network-operations consoles, other suitable components, or any suitable combination thereof. In particular embodiments, networking system 1402 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 1402 to one or more client devices 1406 or one or more third-party system 1408 via network 1404. The web server may include a mail server or other messaging functionality for receiving and routing messages between networking system 1402 and one or more client devices 1406. An API-request server may allow a third-party system 1408 to access information from networking system 1402 by calling one or more APIs. An action logger may be used to receive communications from a web server about a user's actions on or off networking system 1402. In conjunction with the action log, a third-party-content-object log may be maintained of user exposures to third-party-content objects. A notification controller may provide information regarding content objects to a client device 1406. Information may be pushed to a client device 1406 as notifications, or information may be pulled from client device 1406 responsive to a request received from client device 1406.

Authorization servers may be used to enforce one or more privacy settings of the users of networking system 1402. A privacy setting of a user determines how particular information associated with a user can be shared. The authorization server may allow users to opt in to or opt out of having their actions logged by networking system 1402 or shared with other systems (e.g., third-party system 1408), such as, for example, by setting appropriate privacy settings. Third-party-content-object stores may be used to store content objects received from third parties, such as a third-party system 1408. Location stores may be used for storing location information received from client devices 1406 associated with users. Advertisement-pricing modules may combine social information, the current time, location information, or other suitable information to provide relevant advertisements, in the form of notifications, to a user.

Figure 15:
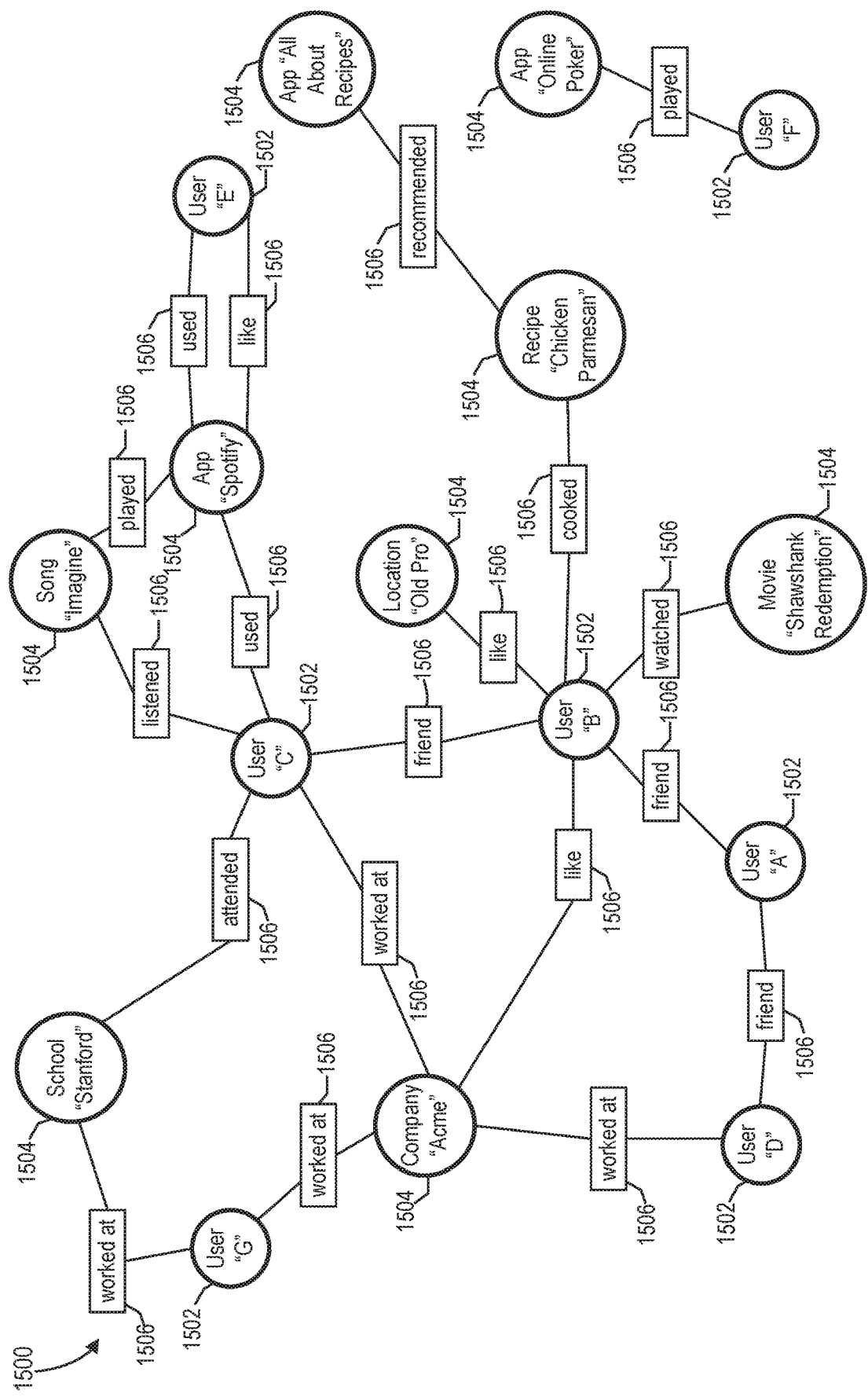
FIG. 15 illustrates an example social graph in accordance with one or more embodiments described herein.

FIG. 15 illustrates example social graph 1500. In particular embodiments, networking system 1402 may store one or more social graphs 1500 in one or more data stores. In particular embodiments, social graph 1500 may include multiple nodes—which may include multiple user nodes 1502 or multiple concept nodes 1504—and multiple edges 1506 connecting the nodes. Example social graph 1500 illustrated in FIG. 15 is shown, for didactic purposes, in a two-dimensional visual map representation. In particular embodiments, a networking system 1402, client device 1406, or third-party system 1408 may access social graph 1500 and related social-graph information for suitable applications. The nodes and edges of social graph 1500 may be stored as data objects, for example, in a data store (such as a social-graph database). Such a data store may include one or more searchable or query able indexes of nodes or edges of social graph 1500.

In particular embodiments, a user node 1502 may correspond to a user of networking system 1402. As an example and not by way of limitation, a user may be an individual (human user), an entity (e.g., an enterprise, business, or third-party application), or a group (e.g., of individuals or entities) that interacts or communicates with or over networking system 1402. In particular embodiments, when a user registers for an account with networking system 1402, networking system 1402 may create a user node 1502 corresponding to the user, and store the user node 1502 in one or more data stores. Users and user nodes 1502 described herein may, where appropriate, refer to registered users and user nodes 1502 associated with registered users. In addition or as an alternative, users and user nodes 1502 described herein may, where appropriate, refer to users that have not registered with networking system 1402. In particular embodiments, a user node 1502 may be associated with information provided by a user or information gathered by various systems, including networking system 1402. As an example and not by way of limitation, a user may provide his or her name, profile picture, contact information, birth date, sex, marital status, family status, employment, education background, preferences, interests, or other demographic information. In particular embodiments, a user node 1502 may be associated with one or more data objects corresponding to information associated with a user. In particular embodiments, a user node 1502 may correspond to one or more webpages.

In particular embodiments, a concept node 1504 may correspond to a concept. As an example and not by way of limitation, a concept may correspond to a place (such as, for example, a movie theater, restaurant, landmark, or city); a website (such as, for example, a website associated with networking system 1402 or a third-party website associated with a web-application server); an entity (such as, for example, a person, business, group, sports team, or celebrity); a resource (such as, for example, an audio file, video file, digital photo, text file, structured document, or application) which may be located within networking system 1402 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1504 may be associated with information of a concept provided by a user or information gathered by various systems, including networking system 1402. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1504 may be associated with one or more data objects corresponding to information associated with concept node 1504. In particular embodiments, a concept node 1504 may correspond to one or more webpages.

In particular embodiments, a node in social graph 1500 may represent or be represented by a webpage (which may be referred to as a "profile page"). Profile pages may be hosted by or accessible to networking system 1402. Profile pages may also be hosted on third-party websites associated with a third-party system 1408. As an example and not by way of limitation, a profile page corresponding to a particular external webpage may be the particular external webpage and the profile page may correspond to a particular concept node 1504. Profile pages may be viewable by all or a selected subset of other users. As an example and not by way of limitation, a user node 1502 may have a corresponding user-profile page in which the corresponding user may add content, make declarations, or otherwise express himself or herself. As another example and not by way of limitation, a concept node 1504 may have a corresponding concept-profile page in which one or more users may add content, make declarations, or express themselves, particularly in relation to the concept corresponding to concept node 1504.

In particular embodiments, a concept node 1504 may represent a third-party webpage or resource hosted by a third-party system 1408. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1406 to send to networking system 1402 a message indicating the user's action. In response to the message, networking system 1402 may create an edge (e.g., an "eat" edge) between a user node 1502 corresponding to the user and a concept node 1504 corresponding to the third-party webpage or resource and store edge 1506 in one or more data stores.

In particular embodiments, a pair of nodes in social graph 1500 may be connected to each other by one or more edges 1506. An edge 1506 connecting a pair of nodes may represent a relationship between the pair of nodes. In particular embodiments, an edge 1506 may include or represent one or more data objects or attributes corresponding to the relationship between a pair of nodes. As an example and not by way of limitation, a first user may indicate that a second user is a "friend" of the first user. In response to this indication, networking system 1402 may send a "friend request" to the second user. If the second user confirms the "friend request," networking system 1402 may create an edge 1506 connecting the first user's user node 1502 to the second user's user node 1502 in social graph 1500 and store edge 1506 as social-graph information in one or more of data stores. In the example of FIG. 15, social graph 1500 includes an edge 1506 indicating a friend relation between user nodes 1502 of user "A" and user "B" and an edge indicating a friend relation between user nodes 1502 of user "C" and user "B." Although this disclosure describes or illustrates particular edges 1506 with particular attributes connecting particular user nodes 1502, this disclosure contemplates any suitable edges 1506 with any suitable attributes connecting user nodes 1502. As an example and not by way of limitation, an edge 1506 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1500 by one or more edges 1506.

In particular embodiments, an edge 1506 between a user node 1502 and a concept node 1504 may represent a particular action or activity performed by a user associated with user node 1502 toward a concept associated with a concept node 1504. As an example and not by way of limitation, as illustrated in FIG. 15, a user may "like," "attended," "played," "listened," "cooked," "worked at," or "watched" a concept, each of which may correspond to an edge type or subtype. A concept-profile page corresponding to a concept node 1504 may include, for example, a selectable "check in" icon (such as, for example, a clickable "check in" icon) or a selectable "add to favorites" icon. Similarly, after a user clicks these icons, networking system 1402 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 1402 may create a "listened" edge 1506 and a "used" edge (as illustrated in FIG. 15) between user nodes 1502 corresponding to the user and concept nodes 1504 corresponding to the song and application to indicate that the user listened to the song and used the application. Moreover, networking system 1402 may create a "played" edge 1506 (as illustrated in FIG. 15) between concept nodes 1504 corresponding to the song and the application to indicate that the particular song was played by the particular application. In this case, "played" edge 1506 corresponds to an action performed by an external application (SPOTIFY) on an external audio file (the song "Imagine"). Although this disclosure describes particular edges 1506 with particular attributes connecting user nodes 1502 and concept nodes 1504, this disclosure contemplates any suitable edges 1506 with any suitable attributes connecting user nodes 1502 and concept nodes 1504. Moreover, although this disclosure describes edges between a user node 1502 and a concept node 1504 representing a single relationship, this disclosure contemplates edges between a user node 1502 and a concept node 1504 representing one or more relationships. As an example and not by way of limitation, an edge 1506 may represent both that a user likes and has used at a particular concept. Alternatively, another edge 1506 may represent each type of relationship (or multiples of a single relationship) between a user node 1502 and a concept node 1504 (as illustrated in FIG. 15 between user node 1502 for user "E" and concept node 1504 for "SPOTIFY").

In particular embodiments, networking system 1402 may create an edge 1506 between a user node 1502 and a concept node 1504 in social graph 1500. As an example and not by way of limitation, a user viewing a concept-profile page (such as, for example, by using a web browser or a special-purpose application hosted by the user's client device 1406) may indicate that he or she likes the concept represented by the concept node 1504 by clicking or selecting a "Like" icon, which may cause the user's client device 1406 to send to networking system 1402 a message indicating the user's liking of the concept associated with the concept-profile page. In response to the message, networking system 1402 may create an edge 1506 between user node 1502 associated with the user and concept node 1504, as illustrated by "like" edge 1506 between the user and concept node 1504. In particular embodiments, networking system 1402 may store an edge 1506 in one or more data stores. In particular embodiments, an edge 1506 may be automatically formed by networking system 1402 in response to a particular user action. As an example and not by way of limitation, if a first user uploads a picture, watches a movie, or listens to a song, an edge 1506 may be formed between user node 1502 corresponding to the first user and concept nodes 1504 corresponding to those concepts. Although this disclosure describes forming particular edges 1506 in particular manners, this disclosure contemplates forming any suitable edges 1506 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 1402). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 1402 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 1402) or RSVP (e.g., through networking system 1402) to an event associated with the advertisement. In addition or as an alternative, an advertisement may include social-networking-system context directed to the user. As an example and not by way of limitation, an advertisement may display information about a friend of the user within networking system 1402 who has taken an action associated with the subject matter of the advertisement.

In particular embodiments, networking system 1402 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1408 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 1402 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 1402 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 1402 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 1402 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 1402 may calculate a coefficient based on a user's actions. Networking system 1402 may monitor such actions on the online social network, on a third-party system 1408, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 1402 may calculate a coefficient based on the user's actions with particular types of content. The content may be associated with the online social network, a third-party system 1408, or another suitable system. The content may include users, profile pages, posts, news stories, headlines, instant messages, chat room conversations, emails, advertisements, pictures, video, music, other suitable objects, or any combination thereof. Networking system 1402 may analyze a user's actions to determine whether one or more of the actions indicate an affinity for subject matter, content, other users, and so forth. As an example and not by way of limitation, if a user may make frequently posts content related to "coffee" or variants thereof, networking system 1402 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 1402 may calculate a coefficient based on the type of relationship between particular objects. Referencing the social graph 1500, networking system 1402 may analyze the number and/or type of edges 1506 connecting particular user nodes 1502 and concept nodes 1504 when calculating a coefficient. As an example and not by way of limitation, user nodes 1502 that are connected by a spouse-type edge (representing that the two users are married) may be assigned a higher coefficient than a user node 1502 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 1402 may determine that the user has a higher coefficient with respect to the first photo than the second photo because having a tagged-in-type relationship with content may be assigned a higher weight and/or rating than having a like-type relationship with content. In particular embodiments, networking system 1402 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 1402 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1500. As an example and not by way of limitation, social-graph entities that are closer in the social graph 1500 (i.e., fewer degrees of separation) may have a higher coefficient than entities that are further apart in the social graph 1500.

In particular embodiments, networking system 1402 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 1406 of the user). A first user may be more interested in other users or concepts that are closer to the first user. As an example and not by way of limitation, if a user is one mile from an airport and two miles from a gas station, networking system 1402 may determine that the user has a higher coefficient for the airport than the gas station based on the proximity of the airport to the user.

In particular embodiments, networking system 1402 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 1402 may provide information that is relevant to user's interests and current circumstances, increasing the likelihood that they will find such information of interest. In particular embodiments, networking system 1402 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 1402 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 1402 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1408 (e.g., via an API or other communication channel), or from another suitable system. In response to the request, networking system 1402 may calculate the coefficient (or access the coefficient information if it has previously been calculated and stored). In particular embodiments, networking system 1402 may measure an affinity with respect to a particular process. Different processes (both internal and external to the online social network) may request a coefficient for a particular object or set of objects. Networking system 1402 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/971,4027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1504 corresponding to a particular photo may have a privacy setting specifying that the photo may only be accessed by users tagged in the photo and their friends. In particular embodiments, privacy settings may allow users to opt in or opt out of having their actions logged by networking system 1402 or shared with other systems (e.g., third-party system 1408). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1408, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 1402 may send a request to the data store for the object. The request may identify the user associated with the request and may only be sent to the user (or a client device 1406 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   determining, via a publisher computing device, a first significance of a first event category and a second significance of a second event category; and
   generating a machine learning model for providing targeted digital content to computing devices of additional users by:
     analyzing a digital repository of user activity to identify a training user that has performed one or more events from the first event category and one or more events from the second event category, wherein the training user has a corresponding set of user characteristics;
     generating a training composite utility score for the training user by applying the first significance to the one or more events from the first event category performed by the training user and the second significance to the one or more events from the second event category performed by the training user;
     generating a predicted set of user characteristics utilizing the machine learning model from the training composite utility score; and
     training the machine learning model by comparing the predicted set of user characteristics to the corresponding set of user characteristics of the training user.

2. The method of claim 1, further comprising:
   determining a composite utility score that satisfies a threshold; and
   generating, utilizing the trained machine learning model, a set of target user characteristics from the composite utility score.

3. The method of claim 2, further comprising utilizing the machine learning model to provide digital content to a client device of an additional user having a second set of user characteristics by:
   providing the digital content to the client device of the additional user based on a comparison between the set of target user characteristics and the second set of user characteristics of the additional user.

4. The method of claim 1, further comprising:
   providing, to the publisher computing device, a user interface comprising one or more selectable significance options; and
   identifying the first significance of the first event category and the second significance of the second event category based on user interaction with the one or more selectable significance options.

5. The method of claim 1, wherein generating the training composite utility score comprises:
   determining a first event category score corresponding to the one or more events from the first event category performed by the training user and a second event category score corresponding to the one or more events from the second event category performed by the training user; and
   applying a first weight corresponding to the first significance to the first event category score and a second weight corresponding to the second significance to the second event category score.

6. The method of claim 5, wherein determining the first event category score comprises determining at least one of: a number of events from the first event category performed by the training user or a monetary value associated with the one or more events from the first event category performed by the training user.

7. The method of claim 5, further comprising normalizing the first event category score by comparing the first event category score associated with the training user with additional first event category scores associated with additional users.

8. The method of claim 1, wherein:
   the first event category comprises a purchase event category;
   the second event category comprises an add-to-cart event category;
   the one or more events from the first event category comprise one or more purchases by the training user; and
   the one or more events from the second event category comprise one or more instances of the training user adding an item to a digital shopping cart.

9. A system comprising:
at least one processor; and
a non-transitory computer readable storage medium comprising instructions that, when executed by the at least one processor, cause the system to:
determine a first significance of a first event category and a second significance of a second event category;
identify a training user that has performed one or more events from the first event category and one or more events from the second event category, wherein the training user has a corresponding set of user characteristics;
generate a training composite utility score for the training user by applying the first significance to the one or more events from the first event category performed by the training user and the second significance to the one or more events from the second event category performed by the training user;
generate a predicted set of user characteristics utilizing a machine learning model from the training composite utility score; and
train the machine learning model by comparing the predicted set of user characteristics to the corresponding set of user characteristics of the training user; and
utilize the machine learning model to provide digital content to a client device of an additional user.

10. The system of claim 9, further comprising instructions that, when executed by the at least one processor, cause the system to:
determine a composite utility score that satisfies a threshold; and
generate, utilizing the trained machine learning model, a set of target user characteristics from the composite utility score.

11. The system of claim 10, further comprising instructions that, when executed by the at least one processor, cause the system to utilize the machine learning model to provide digital content to a client device of an additional user having a second set of user characteristics by comparing the set of target user characteristics and the second set of user characteristics of the additional user.

12. The system of claim 9, further comprising instructions that, when executed by the at least one processor, cause the system to:
provide, to a publisher computing device, a user interface comprising one or more selectable significance options; and
identify the first significance of the first event category and the second significance of the second event category based on user interaction with the one or more selectable significance options.

13. The system of claim 9, further comprising instructions thereon that, when executed by the at least one processor, cause the system to determine a first event category score associated with the first event category and a second event category score associated with the second event category, wherein first event category score comprises one or more of: a total number of events of the first event category that the training user has performed, a monetary value of events of the first event category that the training user has performed, or an influence value associated with the training user.

14. The system of claim 9, further comprising instructions that, when executed by the at least one processor, cause the system to identify the training user by analyzing a digital repository of user activity to determine a number of instances where the training user has performed an event from the first event category and a number of instances where the training user has performed an event from the second event category.

15. A non-transitory computer readable storage medium comprising instructions that, when executed by at least one processor, cause a computer device to:
determine a first significance of a first event category and a second significance of a second event category; and
generate a machine learning model for providing targeted digital content to client devices of additional users by:
identifying a training user that has performed one or more events from the first event category and one or more events from the second event category, wherein the training user has a corresponding set of user characteristics;
generating a training composite utility score for the training user by applying the first significance to the one or more events from the first event category performed by the training user and the second significance to the one or more events from the second event category performed by the training user;
generating a predicted set of user characteristics utilizing the machine learning model from the training composite utility score; and
training the machine learning model by comparing the predicted set of user characteristics to and the corresponding set of user characteristics of the training user.

16. The non-transitory computer readable storage medium of claim 15, further comprising instructions that, when executed by the at least one processor, cause the computer device to:
determine a composite utility score that satisfies a threshold; and
generate, utilizing the trained machine learning model, a set of target user characteristics from the composite utility score.

17. The non-transitory computer readable storage medium of claim 16, further comprising instructions that, when executed by the at least one processor, cause the computer device to:
provide the targeted digital content to a client device of an additional user based on a comparison between the set of target user characteristics that correspond to the composite utility score and a second set of user characteristics of the additional user.

18. The non-transitory computer readable storage medium of claim 15, wherein generating the training composite utility score comprises:
determining a first event category score corresponding to the one or more events from the first event category performed by the training user and a second event category score corresponding to the one or more events from the second event category performed by the training user; and
applying a first weight corresponding to the first significance to the first event category score and a second weight corresponding to the second significance to the second event category score.

19. The non-transitory computer readable storage medium of claim 18, wherein determining the first event category score comprises determining at least one of: a number of events from the first event category performed by the training user or a monetary value associated with the one or more events from the first event category performed by the training user.

20. The non-transitory computer readable storage medium of claim 15, further comprising instructions that, when executed by the at least one processor, cause the computer device to:
- identify an impression opportunity corresponding to an additional user; and
- in response to identifying the impression opportunity corresponding to the additional user, utilize the machine learning model to provide digital content to a client device of the additional user.

* * * * *